(12) United States Patent
Yukumoto et al.

(10) Patent No.: US 8,582,176 B2
(45) Date of Patent: Nov. 12, 2013

(54) IMAGE FORMING APPARATUS, IMAGE FORMING SYSTEM, AND METHOD AND PROGRAM FOR SUPPORTING OPERATION INPUT

(75) Inventors: Reiji Yukumoto, Kanagawa (JP); Osamu Torii, Kanagawa (JP); Takahiko Hayashi, Tokyo (JP); Ryo Takemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 13/067,293

(22) Filed: May 23, 2011

(65) Prior Publication Data

US 2011/0310409 A1 Dec. 22, 2011

(30) Foreign Application Priority Data

Jun. 22, 2010 (JP) ................................. 2010-142005

(51) Int. Cl.
*G06F 15/00* (2006.01)
*G06F 3/12* (2006.01)
*G06F 17/00* (2006.01)

(52) U.S. Cl.
USPC ............ 358/1.9; 358/1.15; 715/204; 715/273

(58) Field of Classification Search
USPC ............................ 358/1.9, 1.15; 715/204, 273
See application file for complete search history.

(56) References Cited

U.S. PATENT DOCUMENTS

| 7,266,590 | B2 * | 9/2007 | Nakaoka et al. | 709/219 |
| 2006/0259949 | A1 * | 11/2006 | Schaefer et al. | 726/1 |
| 2008/0294983 | A1 * | 11/2008 | Hoshino et al. | 715/273 |

FOREIGN PATENT DOCUMENTS

| JP | 2001-306204 A | 11/2001 |
| JP | 2009141685 A | 6/2009 |

* cited by examiner

*Primary Examiner* — Charlotte M Baker
(74) *Attorney, Agent, or Firm* — Harness, Dickey & Pierce, P.L.C.

(57) ABSTRACT

An image forming apparatus connected to an image forming system in which a plurality of image forming apparatuses is linked. The image forming apparatus comprises: a user environment information acquiring unit that acquires user environment information; a user environment information reflecting unit that generates the screen representing the settings by using the user environment information; a capability acquiring unit that acquires capability information representing capabilities; a settability determining unit that determines the settability of various settings; a display control unit that is a unit displaying the screen on the display unit and further displays the screen that represents a determination result of the settability determining unit on the display unit; a search unit that searches for a first image forming apparatus; and a search result output unit that further displays the screen representing a search result of the search unit on the display unit through the display control unit.

15 Claims, 19 Drawing Sheets

FIG.6

|  | IMAGE FORMING APPARATUS 50A | IMAGE FORMING APPARATUS 50B | IMAGE FORMING APPARATUS 50C |
|---|---|---|---|
| FULL-COLOR | ○ | ○ | × |
| DOUBLE-SIDED | × | ○ | ○ |
| STAPLING | × | ○ | ○ |
| A3 SHEET FEEDING | ○ | ○ | ○ |
| ... | ... | ... | ... |

FIG.7

| SETTABILITY INFORMATION | |
|---|---|
| ADDED INFORMATION | DATA |
| SET CONTENT NAME | FULL-COLOR PRINTING |
| PARAMETER | FULL-COLOR |
| USABILITY | × |

| ADDED INFORMATION | DATA |
|---|---|
| SET CONTENT NAME | AGGREGATION |
| PARAMETER | 2 IN 1 |
| USABILITY | ○ |

| ADDED INFORMATION | DATA |
|---|---|
| SET CONTENT NAME | STAPLING |
| PARAMETER | UPPER LEFT SIDE |
| USABILITY | ○ |

FIG.12

| PARAMETER NAME | PARAMETER |
|---|---|
| COLOR PRINTING | FULL-COLOR |
| AGGREGATION | 2 IN 1 |
| STAPLING | UPPER LEFT SIDE |
| : | : |
| : | : |

IMAGE FORMING APPARATUS, IMAGE FORMING SYSTEM, AND METHOD AND PROGRAM FOR SUPPORTING OPERATION INPUT

CROSS-REFERENCE TO RELATED APPLICATIONS

The present application claims priority to and incorporates by reference the entire contents of Japanese Patent Application No. 2010-142005 filed in Japan on Jun. 22, 2010.

BACKGROUND OF THE INVENTION

1. Field of the Invention

The present invention relates to an image forming apparatus, an image forming system, and a method and a program for supporting an operation input.

2. Description of the Related Art

Recently, an image forming apparatus such as a digital copier is being equipped with multiple functions in order to respond to diversification of the use method thereof. However, with the implementation of multiple functions, there increases the number of various print settings such as print conditions set in accordance with the operation input of a user through an operation panel, and thus the operation input relating to the print settings for acquiring a print result that is desired by a user tends to be complicated. Accordingly, whether a user interface is easy to use, when performing the operation input, differs depending on the user's level of proficiency in using the image forming apparatus or on the use scene. Thus, there is known a technology for customizing the switching between display/non-display of elements (buttons or the like) configuring an operation screen, the rearrangement of the elements, and the like, or a technology for sharing the layout of the customized operation screen among the apparatuses connected to a network. In addition, there is known a technology for eliminating the confusion caused due to different initial values of parameters for each apparatus or eliminating the time and effort for inputting parameters, by sharing the set parameters (the scanning resolution, the density, or the like) among the apparatuses connected to a network. For example, Japanese Patent Application Laid-open No. 2001-306204 discloses a configuration in which settings of parameters relating to a customized screen layout and various print settings are generated as the user setting contents and are shared among the apparatuses connected to a network. In addition, there is known a configuration in which, when a print setting that cannot be set for an apparatus actually used by a user is included in the user setting contents, an alternate print setting which can be set for that apparatus is suggested.

However, according to a conventional technology, even though there are user setting contents to be shared by the apparatuses connected to the network, there may be a print setting that cannot be set for an apparatus actually used by the user. Accordingly, there is a concern that a print result initially desired by the user may not be acquired even when an alternate print setting is suggested for that apparatus.

SUMMARY OF THE INVENTION

It is an object of the present invention to at least partially solve the problems in the conventional technology.

According to an aspect of the present invention, an image forming apparatus that is connected to an image forming system in which a plurality of image forming apparatuses being linked can perform image processing, and serves as an operation target on which an operation input is performed by a user, the image forming apparatus includes: a user environment information acquiring unit that acquires user environment information, which is information shared among the plurality of image forming apparatuses, including screen layout information that represents a layout of a screen displayed by a display unit when the user performs the operation input of instructing to perform the image processing and setting information that represents various settings relating to the image processing; a user environment information reflecting unit that generates the screen representing the settings by using the user environment information acquired by the user environment information acquiring unit; a capability acquiring unit that acquires capability information representing capabilities, relating to all or a part of the settings, of the plurality of image forming apparatuses; a settability determining unit that determines the settability of various settings represented in the setting information by using the capability information acquired by the capability acquiring unit and the setting information included in the user environment information; a display control unit that is a unit displaying the screen on the display unit and further displays the screen that represents a determination result of the settability determining unit on the display unit; a search unit that searches for a first image forming apparatus for which the various settings represented in the setting information can be set and a second image forming apparatus for which all or a part of the various settings represented in the setting information cannot be set; and a search result output unit that further displays the screen representing a search result of the search unit on the display unit through the display control unit.

According to another aspect of the present invention, an image forming system in which a plurality of image forming apparatuses being linked can perform image processing, and an image forming apparatus serving as an operation target, for which an operation input is performed by a user, out of the plurality of image forming apparatuses, includes: a user environment information acquiring unit that acquires user environment information, which is information shared among the plurality of image forming apparatuses, including screen layout information that represents a layout of a screen displayed by a display unit when the user performs the operation input of instructing to perform the image processing and setting information that represents various settings relating to the image processing; a user environment information reflecting unit that generates the screen representing the settings by using the user environment information acquired by the user environment information acquiring unit; a first capability acquiring unit that acquires capability information representing capabilities relating to all or a part of the settings of the plurality of image forming apparatuses; a first settability determining unit that determines the settability of various settings represented in the setting information by using the capability information acquired by the first capability acquiring unit and the setting information included in the user environment information; a display control unit that is a unit displaying the screen on the display unit and displays the screen that additionally represents a determination result of the first settability determining unit on the display unit; a search unit that receives settability information representing settability of all or a part of the various settings represented in the setting information from all or a part of the image forming apparatuses other than the image forming apparatus serving as the operation target out of the plurality of image forming apparatuses, and searches for a first image forming apparatus for which all or a part of the various settings represented in the setting information can be set and a second image forming apparatus for which all or a part of the various settings represented in the setting information cannot be set; and a search result output unit that displays the screen further representing a search result of the search unit on the display unit through the display control unit, and all or a part of the other image forming apparatuses each includes: a second capability acquiring unit that acquires the capability information of the image forming apparatus to which the second capability acquiring unit belongs; a second settability determining unit that determines the settability of various settings represented in the setting information by using the capability information acquired by the second capability acquiring unit and the setting information included in the user environment information; and a transmission unit that transmits the settability information representing a determination result of the first settability determining unit to the image forming apparatus serving as the operation target.

According to still another aspect of the present invention, a method of supporting an operation input which is performed by an image forming apparatus that is connected to an image forming system in which a plurality of image forming apparatuses being linked can perform image processing, and serves as an operation target on which an operation input is performed by a user, and the image forming apparatus serving as the operation target includes a user environment information acquiring unit, a user environment information reflecting unit, a capability acquiring unit, a settability determining unit, a display control unit, a search unit, and a search result output unit, the method including: acquiring user environment information, which is information shared among the plurality of image forming apparatuses, including screen layout information that represents a layout of a screen displayed by a display unit when the user performs the operation input of instructing to perform the image processing and setting information that represents various settings relating to the image processing by using the user environment information acquiring unit; generating the screen representing the settings by using the user environment information acquired by the user environment information acquiring unit by using the user environment information reflecting unit; acquiring capability information representing capabilities relating to all or a part of the settings of the plurality of image forming apparatuses by using the capability acquiring unit; determining the settability of various settings represented in the setting information by using the capability information acquired by the capability acquiring unit and the setting information included in the user environment information by using the settability determining unit; displaying the screen that further represents a determination result of the settability determining unit on the display unit by using the display control unit as a unit for displaying the screen on the display unit; searching for a first image forming apparatus for which the various settings represented in the setting information can be set and a second image forming apparatus for which all or a part of the various settings represented in the setting information cannot be set, by using the search unit; and displaying the screen additionally representing a search result of the search unit on the display unit through the display control unit by using the search result output unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an exemplary diagram illustrating capability information of the image forming apparatus;

FIG. 7 is an exemplary diagram illustrating settability information;

FIG. 12 is an exemplary diagram illustrating settability determining information;

DETAILED DESCRIPTION OF THE PREFERRED EMBODIMENTS

Hereinafter, an image forming apparatus, an image forming system, a method of supporting an operation input, and a program, according to embodiments of the present invention will be described in detail with reference to the accompanying drawings.

First Embodiment

Figure 1:
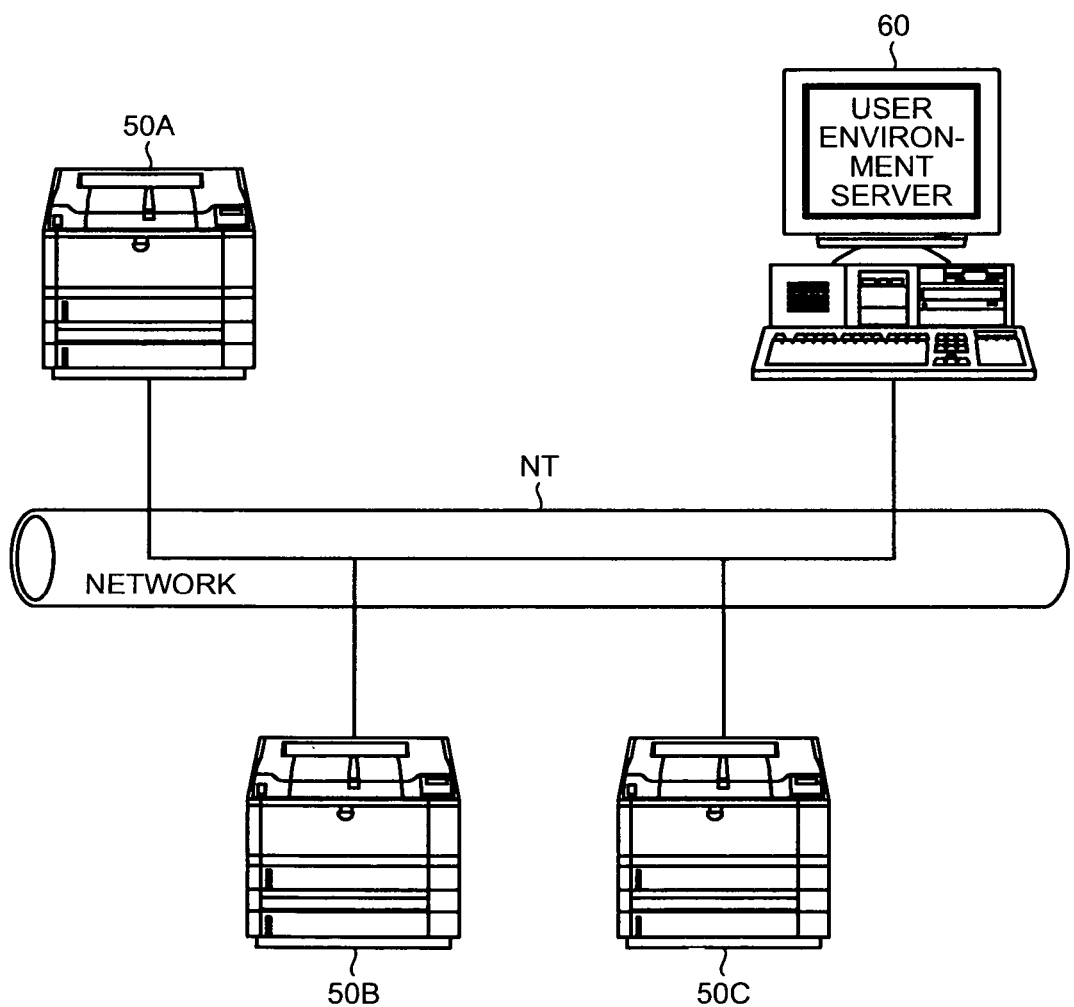
FIG. 1 is an exemplary diagram illustrating the configuration of an image forming system according to a first embodiment.

First, the configuration of an image forming system according to the first embodiment will be described with reference to FIG. 1. The image forming system includes a plurality of image forming apparatuses 50 and a user environment server 60. The image forming apparatuses 50 and the user environment server 60 are interconnected through a network NT. Here, the network NT is, for example, a local area network (LAN), an intranet, an Ethernet (registered trademark), the Internet, or the like. Each of the image forming apparatuses 50A, 50B, and 50C realizes as a printing function, for example, a scanner function for scanning an image from an original and a copy function for printing the image by forming the image scanned from the original and transferring the image to a transfer sheet, in accordance with an operation input from a user. Here, in a case where the image forming apparatuses 50A, 50B, and 50C do not need to be identified separately, each of the image forming apparatuses may be represented as the image forming apparatus 50. The image forming apparatus 50 has a linking function. The linking function is a function in which the image forming apparatus 50 serving as an operation target for an operation input is set as an operation apparatus, and all or some of the other image forming apparatuses 50 are set as linked apparatuses, and then the operation apparatus transmits to the linked apparatuses a process request that is used for requesting to perform the entire or part of the image processing to be performed by the operation apparatus in accordance with an operation input, and thus the image processing is shared by the operation apparatus and the linked apparatuses. Here, the image processing, for example, is a reading process for reading an image or a printing process for printing the read image. In FIG. 1, although an example is illustrated in which three image forming apparatuses 50A, 50B, and 50C are connected to the network NT, the number of the image forming apparatuses 50 connected to the network NT is not limited to three.

The user environment server 60 stores therein user environment information including screen layout information that represents the layout of a print setting screen used for performing a print setting when a user instructs a printing and print setting information that represents a print setting. The user environment server 60 can appropriately update the corresponding user environment information. Each of the image forming apparatuses 50A, 50B, and 50C can acquire the user environment information by accessing the user environment server 60 and lay out the print setting screen using the corresponding user environment information. In addition, each of the image forming apparatuses 50A, 50B, and 50C can generate the user environment information, store the user environment information in the user environment server 60, and update the user environment information.

Figure 2:
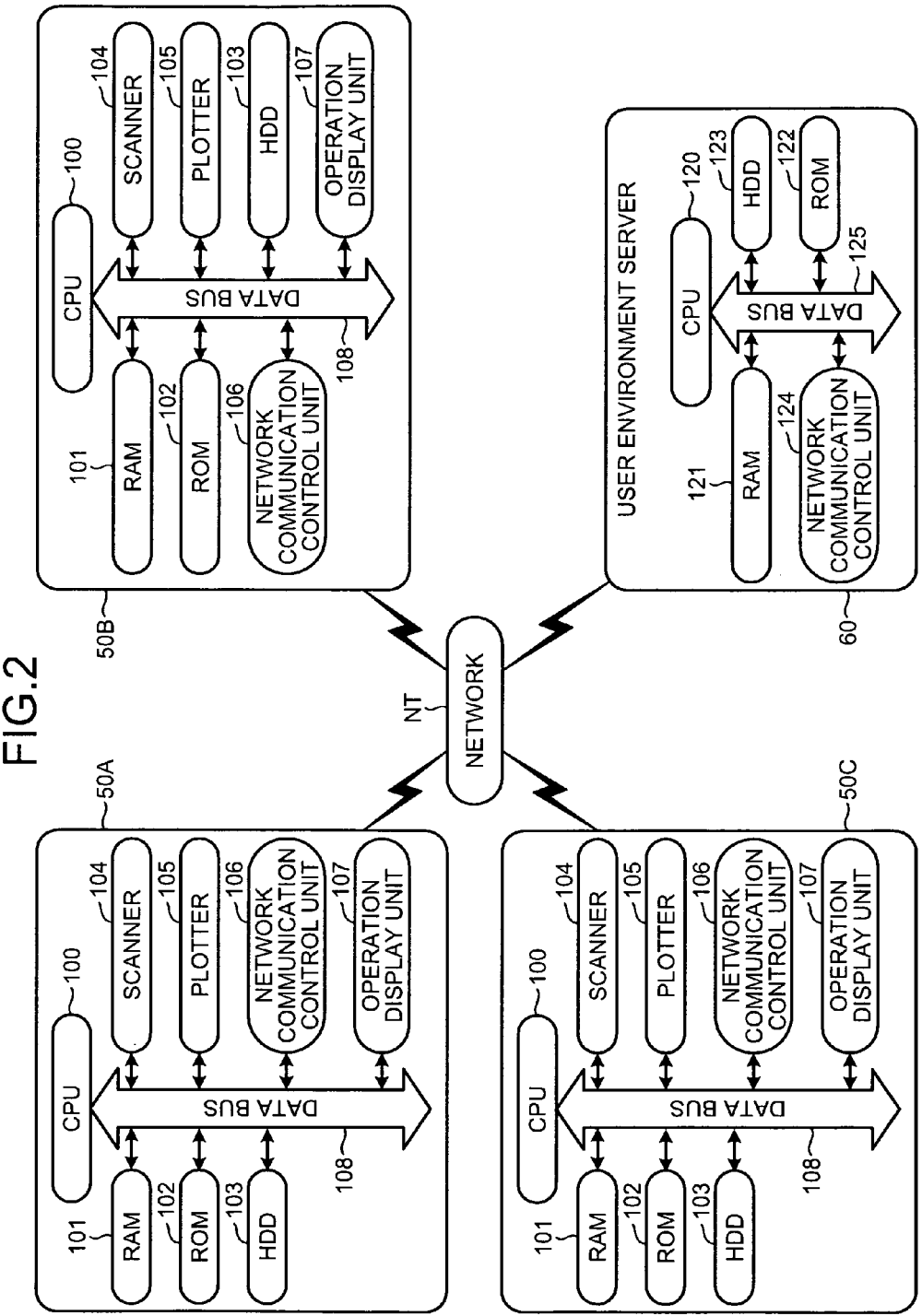
FIG. 2 is an exemplary diagram illustrating the hardware configuration of an image forming apparatus and a user environment server.

Next, the hardware configuration of the image forming apparatus 50 and the user environment server 60 according to the first embodiment will be described with reference to FIG. 2. Each of the image forming apparatuses 50A, 50B, and 50C (image forming apparatus 50) includes a central processing unit (CPU) 100, a random access memory (RAM) 101, a read only memory (ROM) 102, a hard disk drive (HDD) 103, a scanner 104, a plotter 105, a network communication control unit 106, an operation display unit 107, and a data bus 108 that interconnects the above-described units. The CPU 100 controls the overall operation of the image forming apparatus 50 and realizes various functions by executing various programs stored in the ROM 102 or the HDD 103. The RAM 101 temporarily stores various types of data and various programs therein. The ROM 102 stores various types of data and various programs therein. The HDD 103 stores various types of data such as image data and various programs therein. The scanner 104 scans and reads out an image from the original. The plotter 105 performs printing by forming an image read out by the scanner 104 and transferring the image to a transfer sheet. The network communication control unit 106 controls communication between one of the image forming apparatuses 50 and external apparatuses such as other image forming apparatuses 50: and also between one of the image forming apparatuses 50 and the user environment server 60 through the network NT. The operation display unit 107 has a configuration in which an operating section to which an operation is input from a user and a display section that displays information are integrally formed and display various screens that are user interfaces used by a user for performing various operation inputs for the image forming apparatus 50.

The user environment server 60 includes a CPU 120, a RAM 121, a ROM 122, an HDD 123, a network communication control unit 124, and a data bus 125 that interconnects the above-described units. Such a configuration is substantially similar to that described as the configuration of the image forming apparatus 50, and thus, the description thereof will be omitted.

Figure 3:
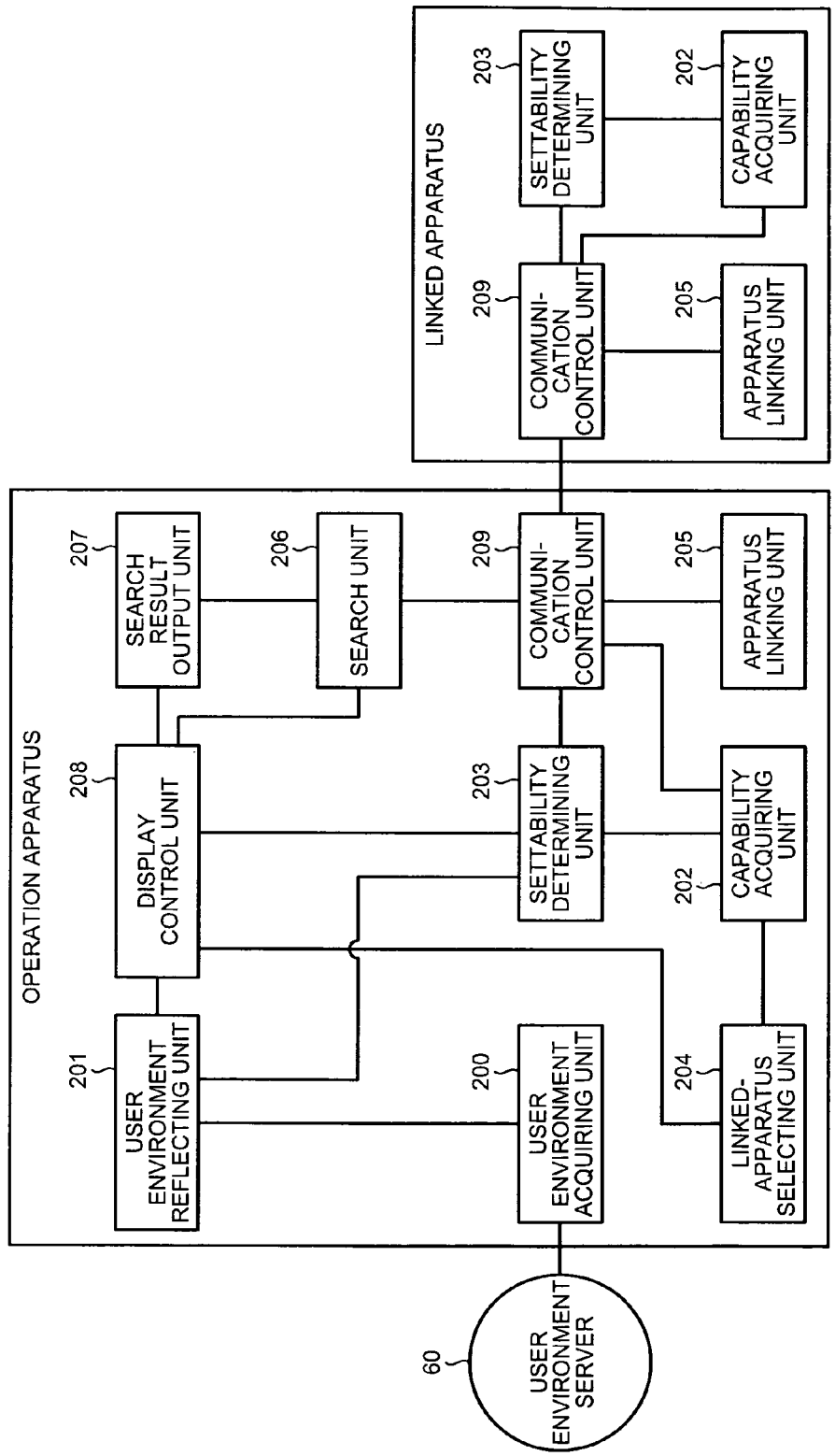
FIG. 3 is an exemplary diagram illustrating the functional configuration of an image forming apparatus.

Next, relating to the hardware configuration, the functional configuration of the image forming apparatus 50 will be described with reference to FIG. 3. The image forming apparatus 50 includes: a user environment acquiring unit 200; a user environment reflecting unit 201; a capability acquiring unit 202; a settability determining unit 203; a linked apparatus selecting unit 204; an apparatus linking unit 205; a search unit 206; a search result output unit 207; a display control unit 208, and a communication control unit 209. The user environment reflecting unit 201, the capability acquiring unit 202, the settability determining unit 203, the linked apparatus selecting unit 204, the apparatus linking unit 205, the search unit 206, the search result output unit 207, and the display control unit 208 are implemented by executing various programs stored in the ROM 102 or the HDD 103 using the CPU 100. The user environment acquiring unit 200 and the communication control unit 209 are implemented by executing various programs stored in the ROM 102 or the HDD 103 using the CPU 100 and the network communication control unit 106.

Figure 4:
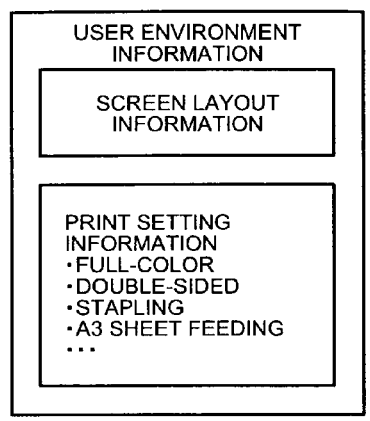
FIG. 4 is an exemplary diagram illustrating user environment information.

In a case where the image forming apparatus 50 operates as the operation apparatus, the user environment acquiring unit 200 acquires user environment information by requesting the user environment information, which includes the screen layout information and the print setting information described above, from the user environment server 60 through the network NT and receiving the corresponding user environment information from the user environment server 60. FIG. 4 is an exemplary diagram illustrating the user environment information. In FIG. 4, as the set content names of the print settings, which are represented by the print setting information, "full-color printing," "double sided printing," "stapling," "A3 sheet feeding," and the like are illustrated. In addition, for each print setting, a detailed set content may be included as a parameter. For example, for the print setting of the "stapling," a position (for example, the upper left side or the like) on a transfer sheet at which stapling is performed is included as the parameter.

Figure 5:
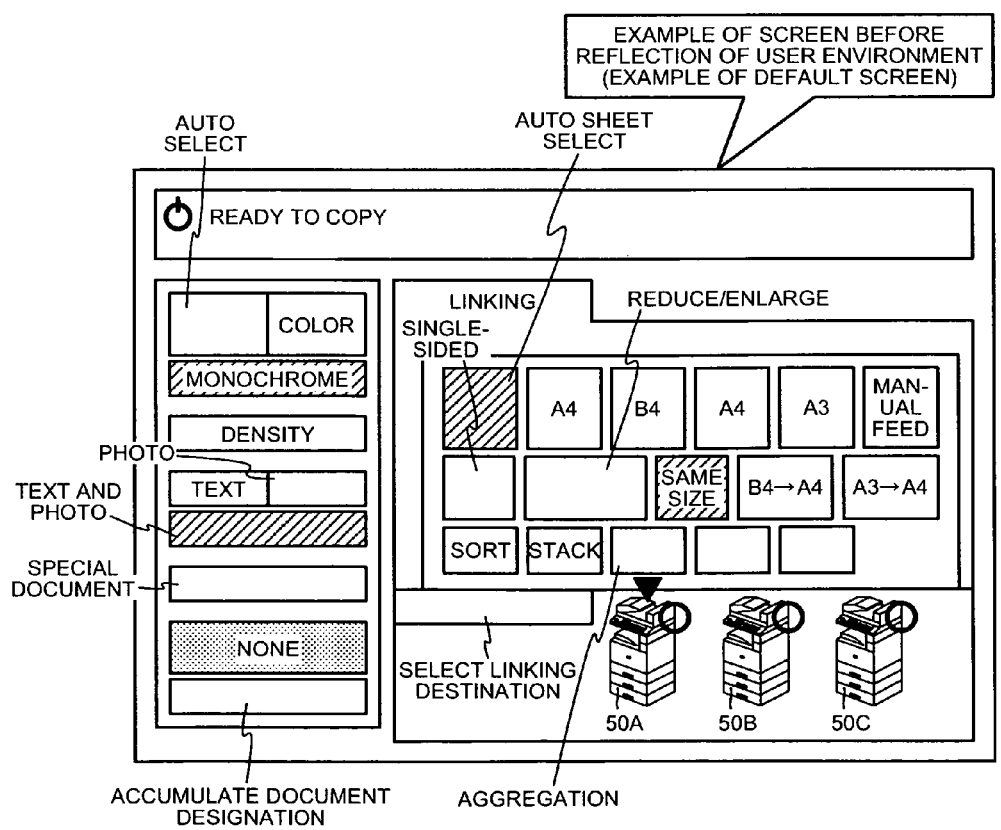
FIG. 5 is an exemplary diagram illustrating a default print setting screen.

In a case where the image forming apparatus 50 operates as the operation apparatus, the user environment reflecting unit 201 generates a print setting screen on which the user environment information is reflected by using the screen layout information and the print setting information acquired by the user environment acquiring unit 200 and a default print setting screen that is used by a user for performing a print setting. Screen configuration information that represents the layout of the default print setting screen, the arrangement of operation buttons, and the like is, for example, stored in the HDD 103 in advance. FIG. 5 is an exemplary diagram illustrating a default print setting screen. As illustrated in FIG. 5, operation buttons representing the set content names of various print settings are displayed on the print setting screen, and the image forming apparatuses 50A, 50B, and 50C connected to the network NT are displayed as icons on the lower portion of the screen as candidates of the linked apparatuses. In FIG. 5, all the image forming apparatuses 50 connected to the network NT illustrated in FIG. 1 are represented as the candidates of linked apparatuses. However, the configuration is not limited thereto, and only some of the image forming apparatuses 50 connected to the network NT may be set as the candidates of the linked apparatuses.

The capability acquiring unit 202 acquires capability information that represents the capability of the image forming apparatus 50. The capability of an image forming apparatus 50 represents print settings that can be set by the image forming apparatus 50. The capability information of the image forming apparatus, for example, is stored in the HDD 103 that is included in the image forming apparatus. In a case where the capability information of the image forming apparatus to which the capability acquiring unit 202 belongs is to be acquired, the capability acquiring unit 202 acquires the capability information by reading out the capability information from the HDD 103. On the other hand, in a case where the capability acquiring unit 202 acquires the capability information of another image forming apparatus 50 serving as a linked apparatus, the capability information is acquired by receiving the capability information from the capability acquiring unit 202 of the another image forming apparatus 50 through the communication control unit 209 of the image forming apparatus 50 to which the capability acquiring unit 202 belongs and the communication control unit 209 of the another image forming apparatus 50.

FIG. 6 is an exemplary diagram illustrating the capability information of the image forming apparatus 50. In FIGS. 6 and 7 "o" represents "available" and "x" represents "unavailable". In FIG. 6, for the image forming apparatus 50A, while the print settings of "full-color printing" and "A3 sheet feeding" can be set, the print settings of "double sided printing" and "stapling" cannot be set. In other words, it is represented that the image forming apparatus 50A do not have the capability of setting the print settings of "double sided printing" and "stapling." For the image forming apparatus 50B, it is represented that print settings of "full-color printing," "A3 sheet feeding," "double sided printing," and "stapling" can be set. In addition, for the image forming apparatus 50C, it is represented that the print settings of "A3 sheet feeding," "double sided printing," and "stapling" can be set, but the print setting of "full-color printing" cannot be set.

Here, the description will return to FIG. 3. The settability determining unit 203 compares the print setting information with the capability information of the image forming apparatus 50 that is acquired by the capability acquiring unit 202. The print setting information is included in the user environment information that is acquired by the user environment acquiring unit 200. The settability determining unit 203 determines whether or not the image forming apparatus 50 can set the various print settings, and stores settability determining information that represents the result of the determination in the HDD 103, for example. This determination includes the determination on whether or not all the various print settings represented by the print setting information can be set and the determination on whether or not each of the various print settings can be set.

FIG. 7 is an exemplary diagram illustrating settability information. In FIG. 7, the determination is represented such that "full-color printing" cannot be set, "2 in 1" of the aggregation for aggregating two pages into one page can be set, and "stapling" at the upper left position can be set.

Here, description will return to FIG. 3. In a case where the image forming apparatus 50 operates as the operation apparatus, when a user performs an operation input of selecting another image forming apparatus 50 on the print setting screen as a linked apparatus, the linked apparatus selecting unit 204 selects the another image forming apparatus 50 as a linked apparatus and requests the acquisition of the capability information of the linked apparatus from the capability acquiring unit 202. On the other hand, when there is an operation input of instructing that the entire or a part of the image processing is performed in the linked apparatus selected by the user on the print setting screen, the linked, apparatus selecting unit 204 notifies the user of the print settings that can be set by the linked apparatus and displays a message, which is used for checking whether or not the image processing is performed in the linked apparatus, on the operation display unit 107 through the display control unit 208. After the displaying of the message, when there is an operation input of instructing that the entire or a part of the image processing is performed in the linked apparatus, the linked apparatus selecting unit 204 transmits a process request that is used for requesting to perform the instructed image processing to the linked apparatus.

In a case where the image forming apparatus 50 operates as a linked apparatus, when a process request that is used for requesting to perform the image processing is transmitted from the operation apparatus that is another image forming apparatus 50, the apparatus linking unit 205 performs image processing according to the process request as the linked apparatus. In a case where the image forming apparatus 50 operates as the operation apparatus, the search unit 206 inquires the linked apparatus connected to the network NT through the communication control unit 209 whether or not the print settings, which are represented in the print setting information, can be set for the linked apparatus connected to the network NT through the communication control unit 209. The search unit 206 searches for an image forming apparatus 50 for which all the corresponding print settings can be set and an image forming apparatus 50 for which all or a part of the corresponding print settings cannot be set. The search result output unit 207 displays the print setting screen, on which the search result acquired by the search unit 206 is reflected, on the operation display unit 107 through the display control unit 208.

In a case where the image forming apparatus 50 operates as the operation apparatus, the display control unit 208 controls the display on the screen of the operation display unit 107. On the operation display unit 107, the display control unit 208 displays: a print setting screen that is generated by the user environment reflecting unit 201; a print setting screen on which the settability information of the operation apparatus according to the request from the settability determining unit 203 is reflected; a print setting screen on which the search result acquired by the search unit 206 in accordance with a request from the search result output unit 207 is reflected; or a message according to the request from the linked apparatus selecting unit 204. The communication control unit 209 controls communications with an external apparatus such as another image forming apparatus 50.

Figure 8:
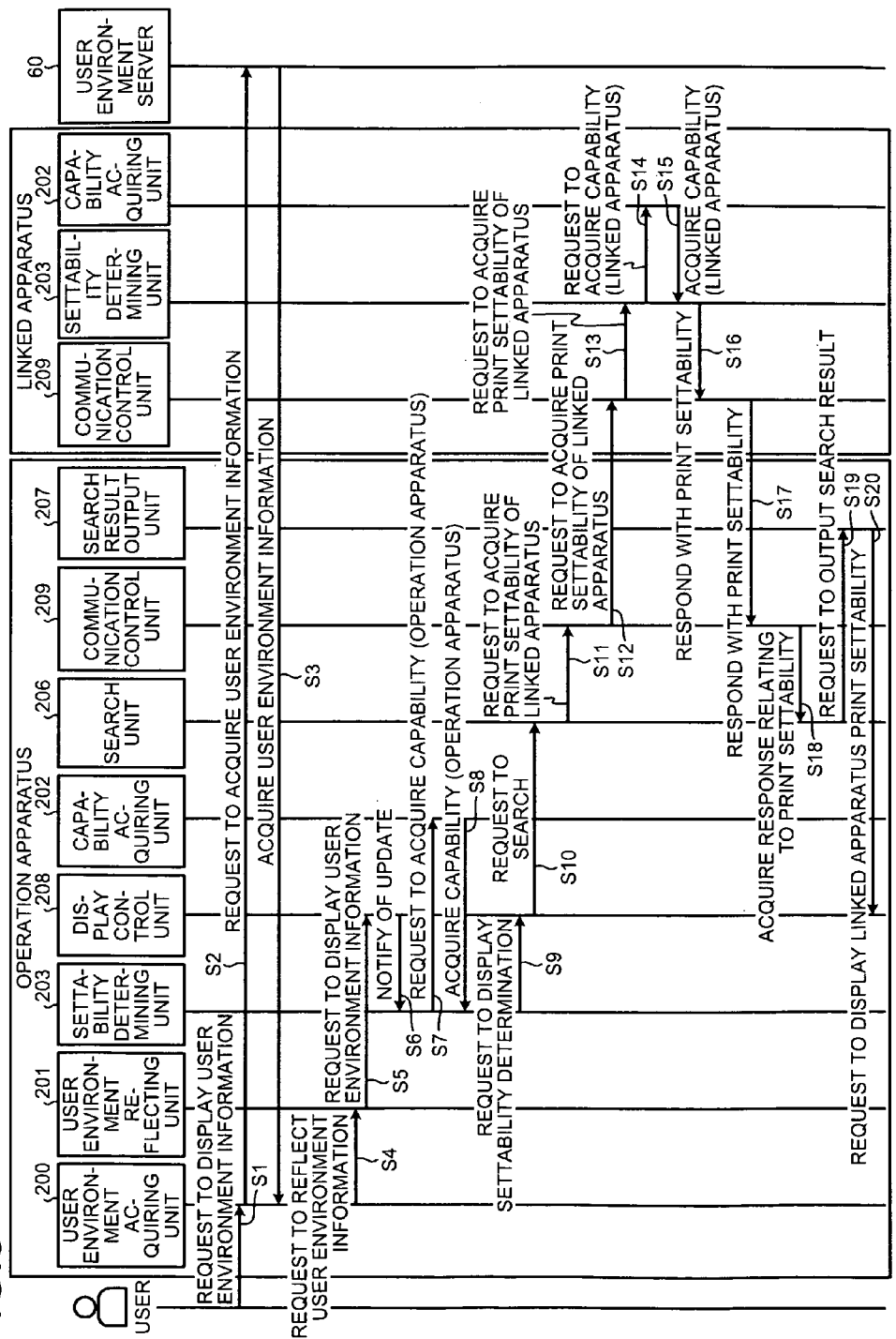
FIG. 8 is a flowchart illustrating the sequence of a process of displaying a print setting screen in the image forming apparatus serving as an operation apparatus.

Next, the process sequence that is performed by the image forming system according to the first embodiment will be described. First, the process sequence of displaying a print setting screen for the image forming apparatus 50 serving as the operation apparatus will be described with reference to FIG. 8. In a case where a user performs an operation input of instructing the display of the user environment information on the image forming apparatus 50 serving as the operation apparatus through the operation display unit 107, the user environment acquiring unit 200 of the image forming apparatus 50 receives the corresponding operation input (step S1), requests the user environment information from the user environment server 60 through the network NT (step S2), and acquires the user environment information (step S3). Then, the user environment acquiring unit 200 delivers the user environment information to the user environment reflecting unit 201 and requests reflection of the corresponding user environment information on the operation screen (step S4). The user environment reflecting unit 201 generates a print setting screen on which the user environment information is reflected by using the screen layout information and the print setting information included in the user environment information and requests the display control unit 208 to display the corresponding print setting screen (step S5). The display control unit 208 displays the corresponding print setting screen on the operation display unit 107 in response to the request and notifies the settability determining unit 203 of the reflection of the user environment information on the print setting screen (step S6).

The settability determining unit 203 requests the capability acquiring unit 202 to acquire the capability information that represents the capability of the information forming apparatus to which the settability determining unit 203 belongs in accordance with the notification (step S7). When the capability information of the image forming apparatus to which the settability determining unit 203 belongs is acquired, the capability acquiring unit 202 delivers the capability information to the settability determining unit 203 (step S8). The settability determining unit 203 compares the capability information with the print setting information acquired in step S3, determines whether or not the various print settings can be set for the information processing apparatus to which the settability determining unit 203 belongs, and stores settability determining information that represents the result of the determination in the HDD 103. Then, the settability determining unit 203 requests that the settability information is reflected on the print setting screen by delivering the settability information to the display control unit 208 (step S9). The display control unit 208 displays the print setting screen on which the settability information of the operation apparatus is reflected in response to the request on the operation display unit 107. At this time, the display control unit 208 displays the print setting screen on the operation display unit 107 such that the print settings that can be set for the operation apparatus and the print settings that cannot be set for the operation apparatus to have different display forms. Then, the display control unit 208 requests the search unit 206 to inquire the linked apparatus whether or not the print settings, which are represented in the print setting information, can be set (step S10). The search unit 206 requests the communication control unit 209 to inquire the linked apparatus whether or not the print settings, which are represented in the print setting information, can be set (step S11). The communication control unit 209 requests the linked apparatus to transmit the settability information that represents whether or not the print settings, which are represented in the print setting information acquired in step S3, can be set in response to the request (step S12).

The communication control unit 209 of the linked apparatus requests the settability determining unit 203 to determine whether or not the print settings, which are represented in the print setting information, can be set in response to the request (step S13). The settability determining unit 203 requests the capability acquiring unit 202 to acquire capability information that represents the capability of the information processing apparatus to which the settability determining unit 203 belongs in response to the request (step S14). Upon acquiring the capability information of the information processing apparatus to which the capability acquiring unit 202 belongs, the capability acquiring unit 202 delivers the capability information to the settability determining unit 203 (step S15). The settability determining unit 203 compares the capability information with the print setting information acquired in step S3, determines whether or not each print setting can be set for the information processing apparatus to which the settability determining unit 203 belongs, and stores the settability determining information that represents the result of the determination in the HDD 103. Then, the settability determining unit 203 delivers the settability information to the communication control unit 209 (step S16). The communication control unit 209 transmits the settability information to the operation apparatus (step S17).

Upon receiving the settability information, the communication control unit 209 of the operation apparatus delivers the settability information to the search unit 206 (step S18). Upon receiving the settability information, the search unit 206 distinguishes those image forming apparatuses 50 for which all the print settings represented in the print setting information acquired in step S3 can be set from other image forming apparatuses 50 for which all or some of the print settings cannot be set; and the search unit 206 requests the search result output unit 207 to output a search result on the basis of the settability information (step S19). Then, the search result output unit 207 requests the display control unit 208 to display the settability of the print settings for the image forming apparatuses 50 that are determined in step S19 in response to the request (step S20). The display control unit 208 displays the print setting screen on which the settability of the print settings is reflected on the operation display unit 107 in response to the request. At this time, the display control unit 208 displays a print setting screen on the operation display unit 107 such that the image forming apparatuses 50 having the print settings that can be set and the image forming apparatuses 50 having the print settings that cannot be set in different display forms.

Figure 9:
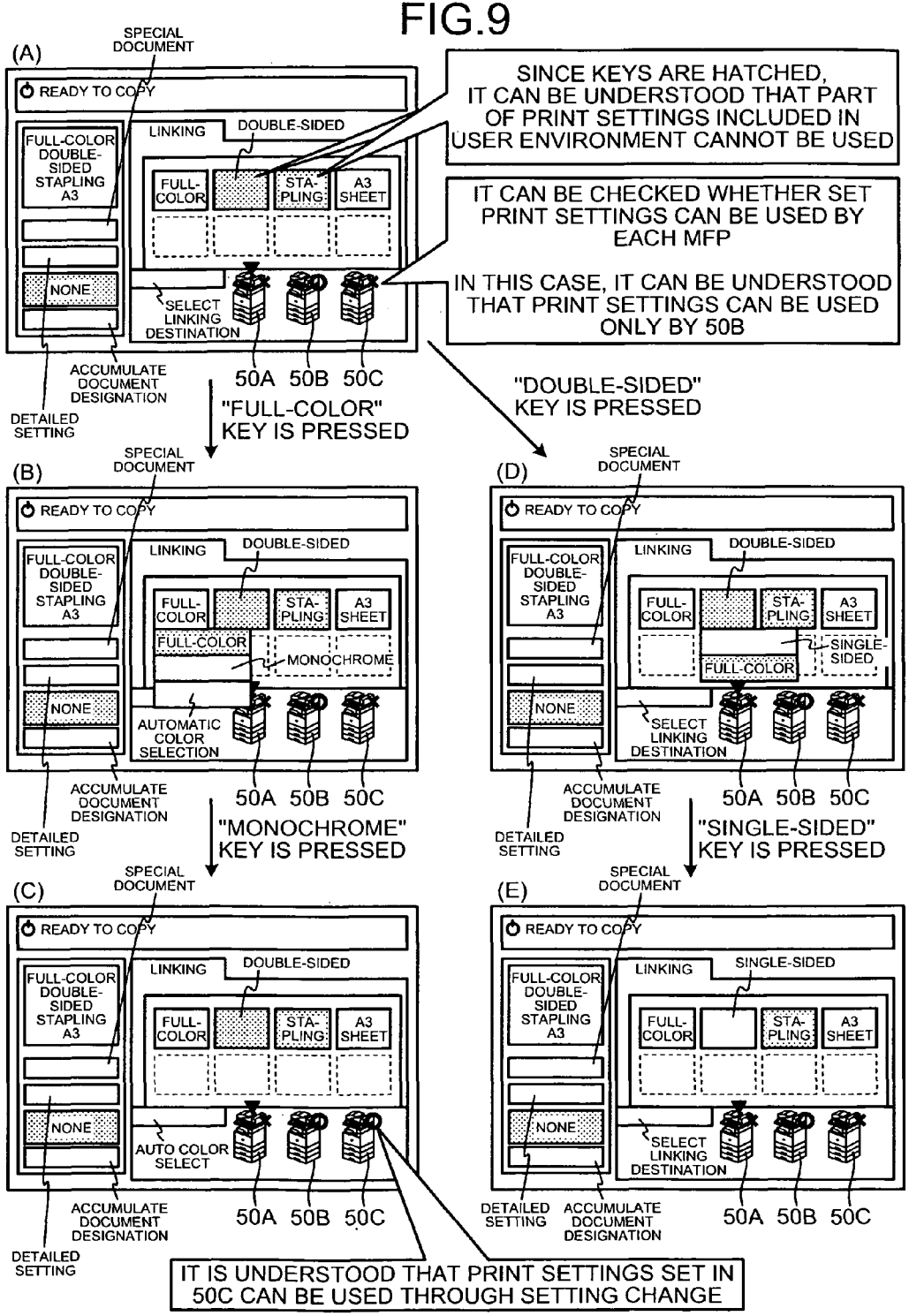
FIG. 9 is an exemplary diagram illustrating transitions of a print setting screen.

FIG. 9 is an exemplary diagram illustrating transitions of a print setting screen. FIG. 9(B) is an exemplary diagram illustrating a default print setting screen illustrated in FIG. 5 as an example on which the user environment information illustrated in FIG. 4 as an example is reflected. In FIG. 9(B), "stapling" and "double-sided (printing)" that are the set content names of print settings, which cannot be set for all or some of the image forming apparatuses 50A, 50B, and 50C for the print setting information included in the user environment information, are displayed with a hatching image effect added. In addition, mark "o" which indicates available or mark "x" which indicates unavailable representing the print settability is added to each of the image forming apparatuses 50A, 50B, and 50C. Described in more detail, mark "o" is added to the icon of the image forming apparatus 50B for which the corresponding print setting can be set, and mark "x" is added to the icons of the image forming apparatuses 50A and 50C for which the corresponding print setting cannot be set.

Next, the process sequence in a case where a user performs an operation input of instructing a change in the set contents of the print settings on the print setting screen will be described with reference to FIG. 10. When the corresponding operation input is performed by the user, the display control unit 208 receives the operation input (step S22), changes the print setting information in accordance with the operation input, and notifies the settability determining unit 203 of the changed print setting information (step S23). The settability determining unit 203 requests the capability acquiring unit 202 to acquire the capability information that represents the capability of the information forming apparatus to which the settability determining unit 203 belongs in accordance with the notification (step S24). When the capability information of the image forming apparatus to which the settability determining unit 203 belongs is acquired, the capability acquiring unit 202 delivers the capability information to the settability determining unit 203 (step S25). The settability determining unit 203 compares the capability information with the print setting information changed in step S23, determines whether or not each of the print settings of which the set contents are changed can be set for the information processing apparatus to which the settability determining unit 203 belongs, and stores settability determining information that represents the result of the determination in the HDD 103, in response to the request. Then, the settability determining unit 203 requests that the settability information is reflected on the print setting screen by delivering the settability information to the display control unit 208 (step S26). The display control unit 208 displays the print setting screen on which the settability information of the operation apparatus is reflected on the operation display unit 107 in response to the request. Then, the display control unit 208 requests the search unit 206 to inquire the linked apparatus whether or not the print settings, which are represented in the print setting information changed in step S23, can be set (step S27). The search unit 206 requests the communication control unit 209 to inquire the linked apparatus whether or not the print settings, which are represented in the print setting information, can be set (step S28). The communication control unit 209 requests the linked apparatus to transmit the settability information that represents whether or not the print settings, which are represented in the print setting information changed in step S23, can be set in response to the request (step S29).

The communication control unit 209 of the linked apparatus requests the settability determining unit 203 to determine whether or not the print settings, which are represented in the print setting information changed in step S23, can be set in response to the request (step S30). The settability determining unit 203 requests the capability acquiring unit 202 to acquire capability information that represents the capability of the information processing apparatus to which the settability determining unit 203 belongs in response to the request (step S31). When the capability information of the information processing apparatus to which the capability acquiring unit 202 belongs is acquired, the capability acquiring unit 202 delivers the capability information to the settability determining unit 203 (step S32). The settability determining unit 203 compares the capability information with the print setting information changed in step S23, determines whether or not each print setting including the print setting of which the set content has been changed can be set for the information processing apparatus to which the settability determining unit 203 belongs, and stores the settability determining information that represents the result of the determination in the HDD 103. Then, the settability determining unit 203 delivers the settability information to the communication control unit 209 (step S33). The communication control unit 209 transmits the settability information to the operation apparatus (step S34).

Upon receiving the settability information, the communication control unit 209 of the operation apparatus delivers the settability information to the search unit 206 (step S35). Upon receiving the settability information, the search unit 206 distinguishes those image forming apparatuses 50 for which all the print settings represented in the print setting information changed in step S23 can be set from other image forming apparatuses 50 for which not all the print settings cannot be set and requests the display control unit 208 to perform a display on the basis of the result of the determination (step S36). The display control unit 208 displays the print setting screen on which the settability of the print settings for the linked apparatus is reflected based on the result of the determination on the operation display unit 107 in response to the request. The above-described process is performed each time an operation input of instructing a change in the set contents of the print settings is performed.

Here, a transition of the print setting screen in a case where a user performs an operation input of instructing a change in the set content of the print setting on the print setting screen illustrated in FIG. 9(A) will be described. As illustrated in FIG. 9(B), when a non-hatched area in which a set content name of the print setting is displayed is pressed as an operation key by the user, the set content of the corresponding print setting is changed. FIG. 9(C) is an exemplary diagram illustrating a print setting screen in a case where "full-color (printing)" is changed to "monochrome (printing)" as the print setting. In FIG. 9(C), when the set content of the print setting is changed, all of the print settings represented in the print setting information can be set for the image forming apparatus 50, and accordingly, the mark representing the settability of the print settings for the image forming apparatus 50, which is displayed on the lower portion of the screen, is changed from "x" indicating unavailable to "o" indicating available. In other words, it is determined that all the print settings represented in the print setting information can be set for the image forming apparatus 50 by the search unit 206 in step S19, the mark representing the settability of the print settings for the image forming apparatus 50 is requested to be changed by the search result output unit 207 in step S20, and thereafter, a changed mark is displayed on the print setting screen by the display control unit 208.

In addition, as illustrated in FIG. 9(D), when a hatched area in which a set content name of the print setting is pressed as an operation key by the user, a change in the set content of the corresponding print setting can be instructed. FIG. 9(E) is an exemplary diagram of a print setting screen in a case where "double-sided (printing)" is changed to "single-sided (printing)" as a print setting. Since the "single-sided (printing)" can be set for all the image forming apparatuses 50A, 50B, and 50C, the set content name is displayed without being hatched.

Figure 11:
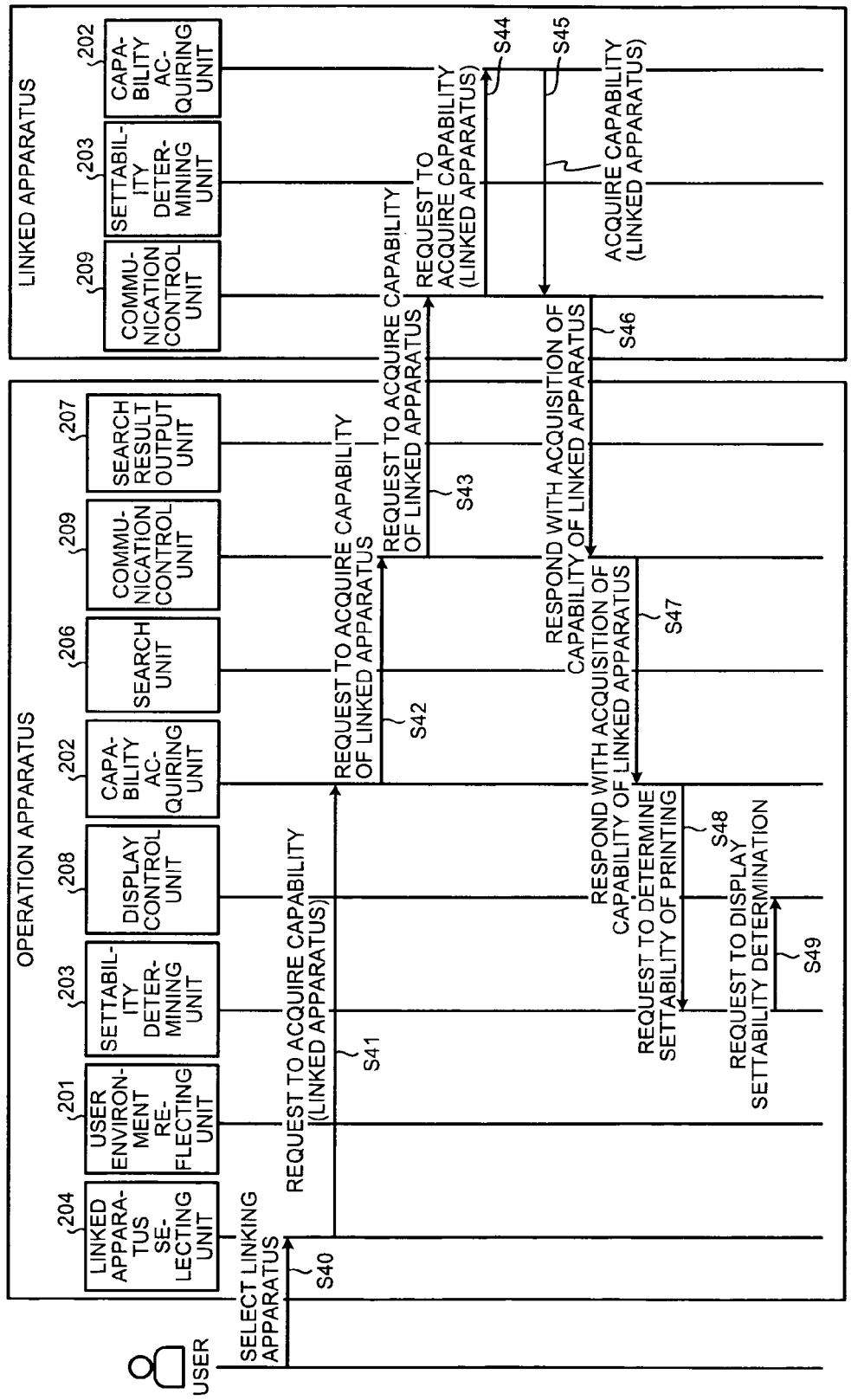
FIG. 11 is a flowchart illustrating the process sequence in a case where a user performs an operation input of selecting a linked apparatus.

Next, the process sequence in a case where the user performs an operation input of selecting a linked apparatus on a print setting screen displayed on the operation apparatus in step S20 will be described with reference to FIG. 11. For example, on the print setting screen illustrated in FIG. 9(A) as an example, when an operation input of selecting a linked apparatus from among the image forming apparatuses 50A, 50B, and 50C of which icons are displayed on the lower portion of the screen is performed, the linked apparatus selecting unit 204 of the image forming apparatus 50 as the operation apparatus receives the operation input (step S40) and requests the capability acquiring unit 202 to acquire the capability information of the selected linked apparatus (step S41). The capability acquiring unit 202 requests the communication control unit 209 to acquire the capability information of the linked apparatus in response to the request (step S42). The communication control unit 209 requests the communication control unit 209 of the linked apparatus to acquire the capability information in response to the request (step S43).

The communication control unit 209 of the linked apparatus requests the capability acquiring unit 202 to acquire the capability information of the linked apparatus in response to the request (step S44). The capability acquiring unit 202 acquires the capability information of the linked apparatus and delivers the capability information to the communication control unit 209 in response to the request (step S45). The communication control unit 209 transmits the capability information to the operation apparatus (step S46).

Upon receiving the capability information, the communication control unit 209 of the operation apparatus delivers the capability information to the capability acquiring unit 202 (step S47). Upon receiving the capability information, the capability acquiring unit 202 requests the settability determining unit 203 to determine whether print settings can be set for the linked apparatus by delivering the capability information thereto (step S48). The settability determining unit 203 compares the capability information with the print setting information acquired in step S3 illustrated in FIG. 8, determines whether or not each of the print settings can be set for the linked apparatus, and stores settability determining information that represents the result of the determination in the HDD 103, in response to the request.

FIG. 12 is an exemplary diagram illustrating the settability determining information. In the example illustrated in FIG. 12, the set content names of the print settings that can be set for the linked apparatus and a set content name of a detailed setting that can be set for each print setting are illustrated. The settability determining unit 203 requests the display control unit 208 to display settability of the print settings for the linked apparatus by delivering the settability information thereto (step S49). The display control unit 208 displays a print setting screen on which the settability of the print settings is reflected on the operation display unit 107 in response to the request.

Figure 13:
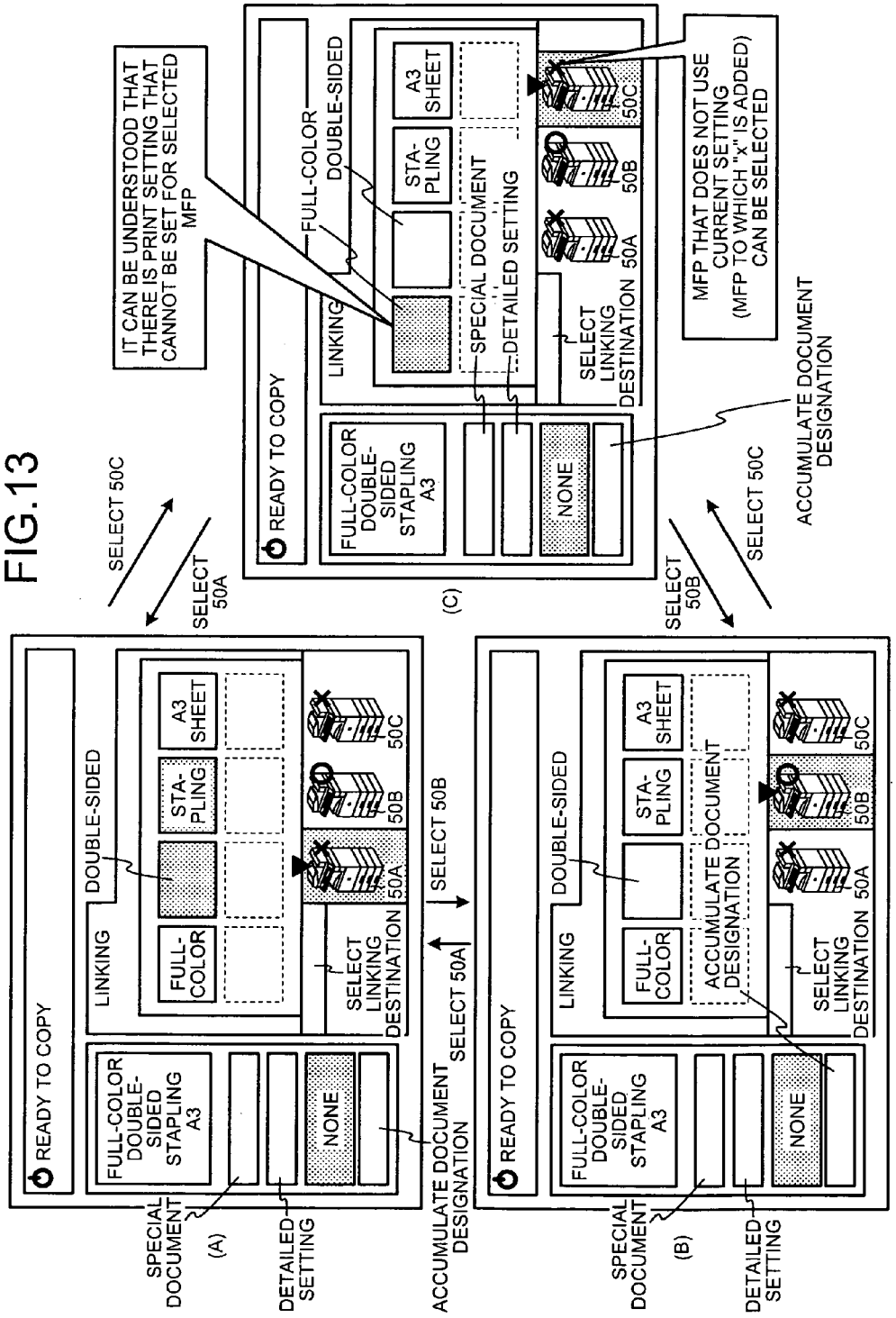
FIG. 13 is an exemplary diagram illustrating transitions of a print setting screen.

FIG. 13 is an exemplary diagram illustrating transitions of a print setting screen. FIG. 13(A) is similar to FIG. 9(A). On a print setting screen illustrated in FIG. 13(A), a case where the image forming apparatus 50A is selected as a linked apparatus is illustrated as an example. On this print setting screen, when an operation input of selecting the image forming apparatus 50B as an linked apparatus is performed, after step S49, a print setting screen illustrated in FIG. 13(B) as an example is displayed on the operation display unit 107. On this print setting screen, in a case where the capability information of the image forming apparatus 50B is the capability information illustrated in FIG. 6 as an example, all the print settings of "full-color printing," "double-sided printing," "stapling," and "A3 sheet feeding" can be set, and accordingly, the set content names are displayed without being hatched. In addition, on this print setting screen, when an operation input of selecting the image forming apparatus 50C as a linked apparatus is performed, a print setting screen illustrated in FIG. 13(C) as an example is displayed on the operation display unit 107. In a case where the capability information of the image forming apparatus 50C is the capability information illustrated in FIG. 6 as an example, on this print setting screen, print settings of "double-sided printing," "stapling" and "A3 sheet feeding" can be set, but a print setting of "full-color printing" cannot be set, and accordingly, the set content name of "full-color printing" is displayed with being hatched. In addition, on this print setting screen, when an operation input of selecting the image forming apparatus 50A as a linked apparatus is performed, the print setting screen illustrated in FIG. 13(A) as an example is displayed on the operation display unit 107. Furthermore, on the print setting screen illustrated in FIG. 13(A) as an example, an operation input of selecting the image forming apparatus 50C is performed, a print setting screen illustrated in FIG. 13(C) is displayed on the operation display unit 107.

By displaying such a print setting screen, a user can easily understand the print settings that can be set or print settings that cannot be set for the linked apparatus prior to the user performs an operation input of instructing the selected linked apparatus to perform printing.

Figure 10:
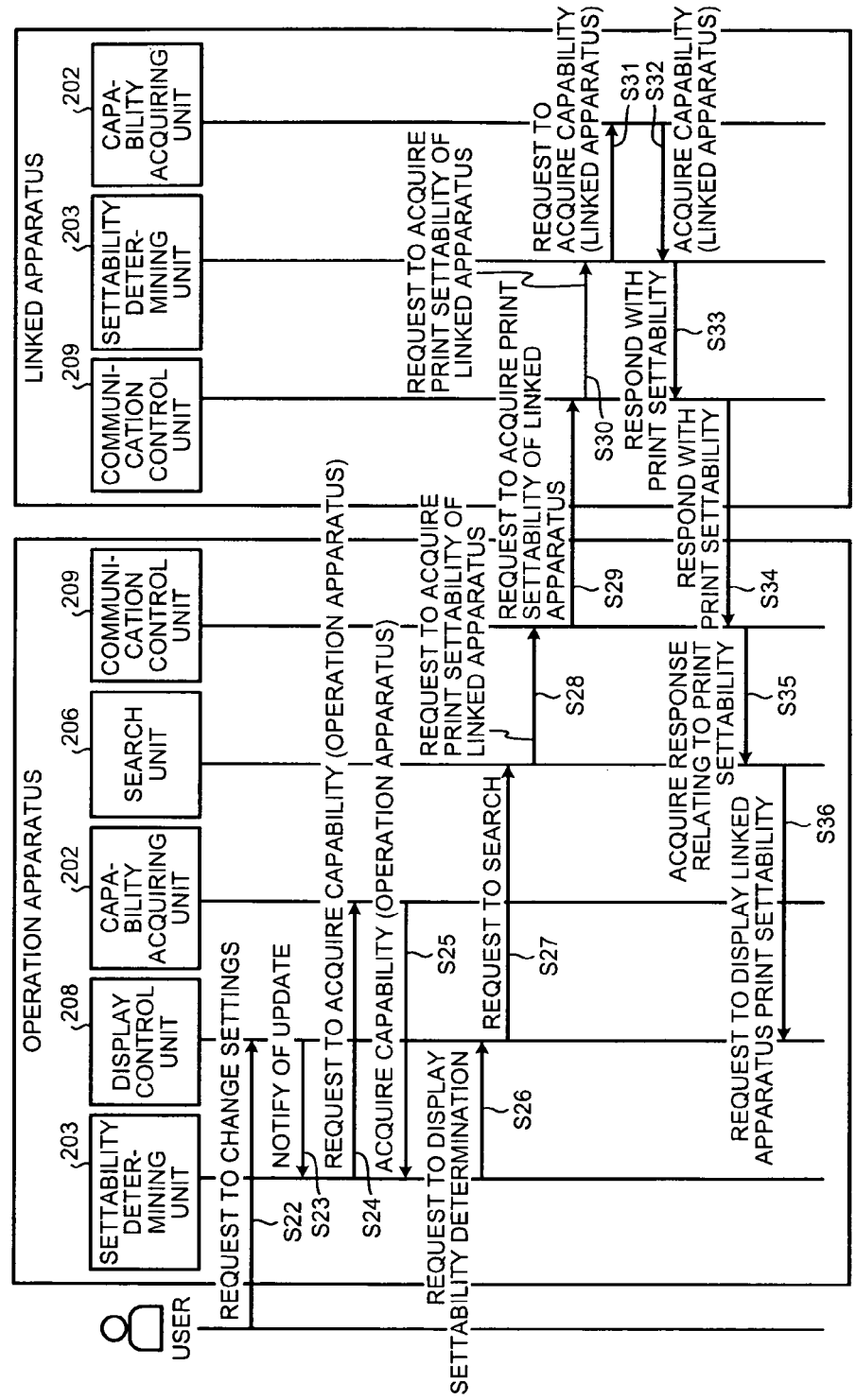
FIG. 10 is a flowchart illustrating the process sequence in a case where a user performs an operation input for an instruction used for changing the set content of a print setting.

Furthermore, on a print setting screen after the user performs the operation input of instructing to change the content of the print setting in step S22 illustrated in FIG. 10, in a case where the user performs an operation input of selecting a linked apparatus is approximately similar to the above-described case. However, in step S49, the settability determining unit 203 compares the capability information with the print setting information changed in step S23.

Figure 14:
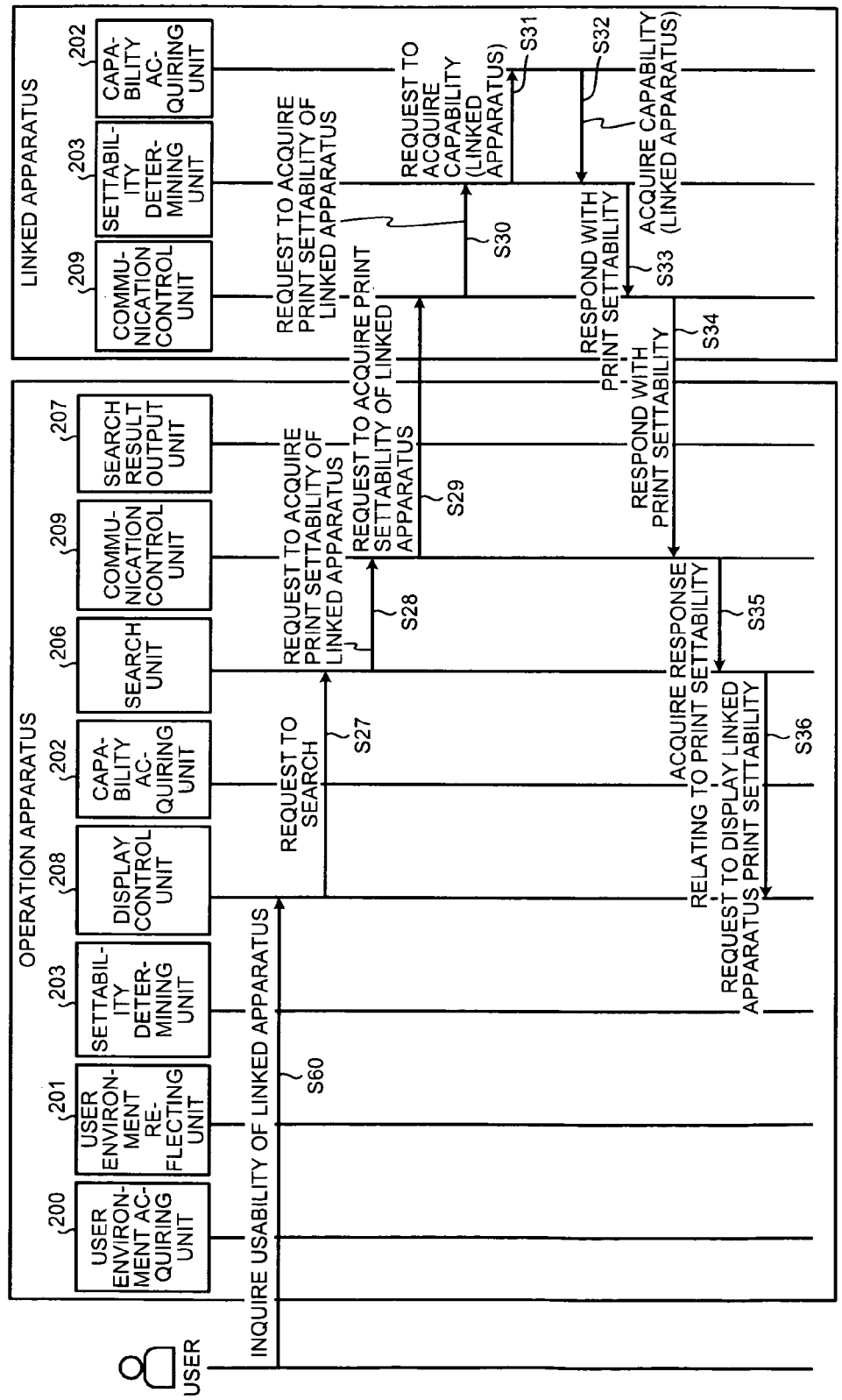
FIG. 14 is a flowchart illustrating the sequence in a case where a user performs an operation input for an instruction for reflecting the settability of a print setting for a linked apparatus on, a print setting screen.

Next, the sequence in a case where a user performs an operation input of instructing to inquire whether the print settings can be set for the linked apparatus will be described with reference to FIG. 14. The operation input is performed as a user presses a predetermined operation button. The linked apparatuses described here are not selected in accordance with a user's operation input but are the image forming apparatuses 50 other than the operation apparatus that are candidates of the linked apparatus. When the user performs an operation input of instructing to inquire whether the print settings can be set for the linked apparatus, the display control unit 208 receives the operation input (step S60) and requests the search unit 206 to inquire whether or not the print settings represented in the print setting information acquired in step S3 illustrated in FIG. 8 or changed in step S23 illustrated in FIG. 10 can be set for the linked apparatus in accordance with the operation input (step S27). Step S28 and after that are the same as those described above, and after step S36, the print setting screen on which the settability of print settings for the linked apparatus is reflected on the operation display unit 107. The above-described process is performed when there is an operation input of instructing to inquire whether the print settings can be set for the linked apparatus. According to such a configuration, the settability of the print settings for the linked apparatus can be reflected on the print setting screen at user's desired operational timing.

Figure 15:
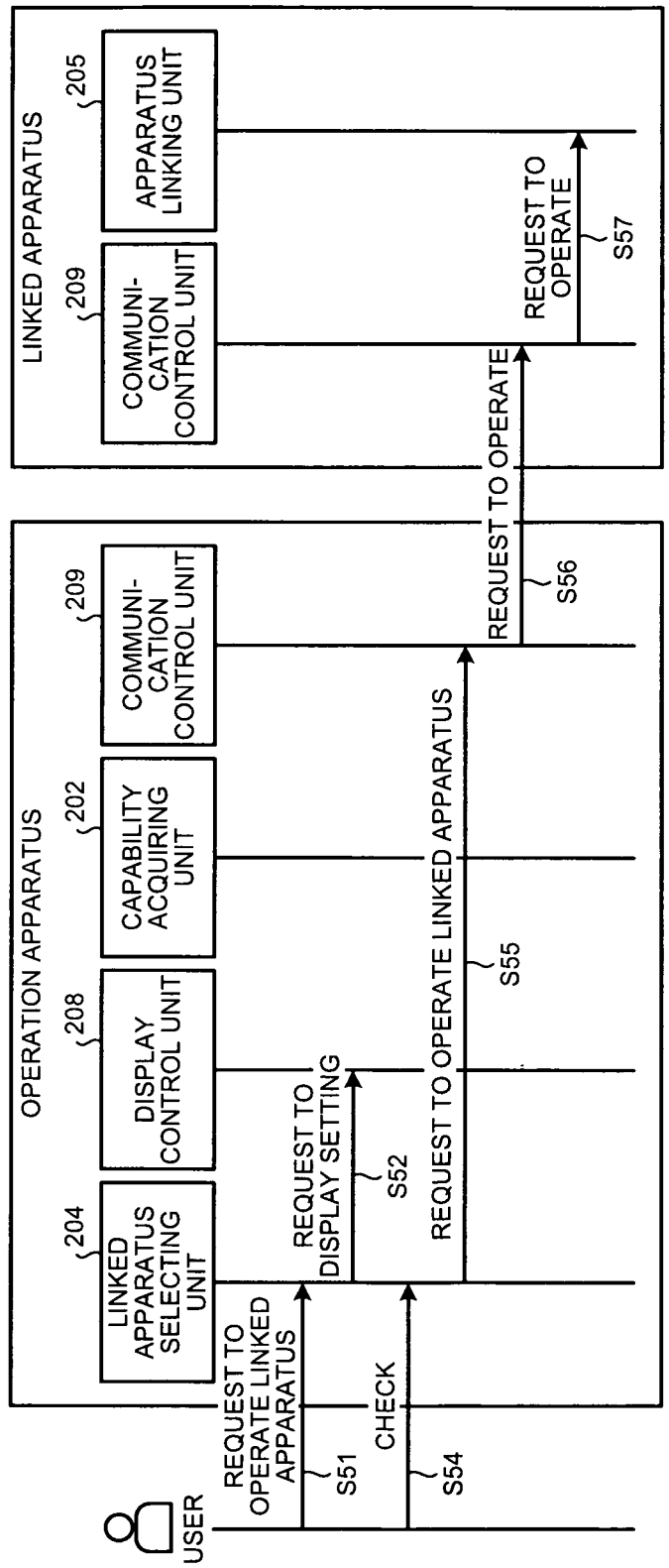
FIG. 15 is a flowchart illustrating the process sequence of transmitting a process request from an operation device to a linked apparatus.

Next, the sequence of a process in which the operation apparatus transmits a process request to a linked apparatus selected in accordance with a user's operation input will be described with reference to FIG. 15. After steps S40 to S49 illustrated in FIG. 11, when a user performs an operation input of instructing to perform printing on a print setting screen displayed on the operation display unit 107, the linked apparatus selecting unit 204 receives the operation input (step S51) and, first, requests the display control unit 208 to display the print setting at which printing is performed by the linked apparatus selected in step S40 (step S52). The display control unit 208 notifies of the print settings that can be set for the linked apparatus and displays a message used for checking whether or not printing is performed on the operation display unit 107, in response to the request. In a case where a user checking the message performs an operation input that denies performing printing in the linked apparatus, the linked apparatus selecting unit 204 stands by the operation input of selecting the image forming apparatuses 50 other than the image forming apparatus 50 selected as the linked apparatus in step S40. On the other hand, the user checking the message performs an operation input of approving the performing printing in the linked apparatus, the linked apparatus selecting unit 204 receives the operation input (step S54) and requests the communication control unit 209 to transmits a process request that is used for requesting to perform a print process for the linked apparatus selected in step S40 (step S55). The communication control unit 209 transmits a process request to the linked apparatus in response to the request (step S56). When the process request is received, the communication control unit 209 of the linked apparatus delivers the process request to the apparatus linking unit 205 (step S57). The apparatus linking unit 205 performs printing by controlling the plotter 105 in response to the process request.

Figure 16:
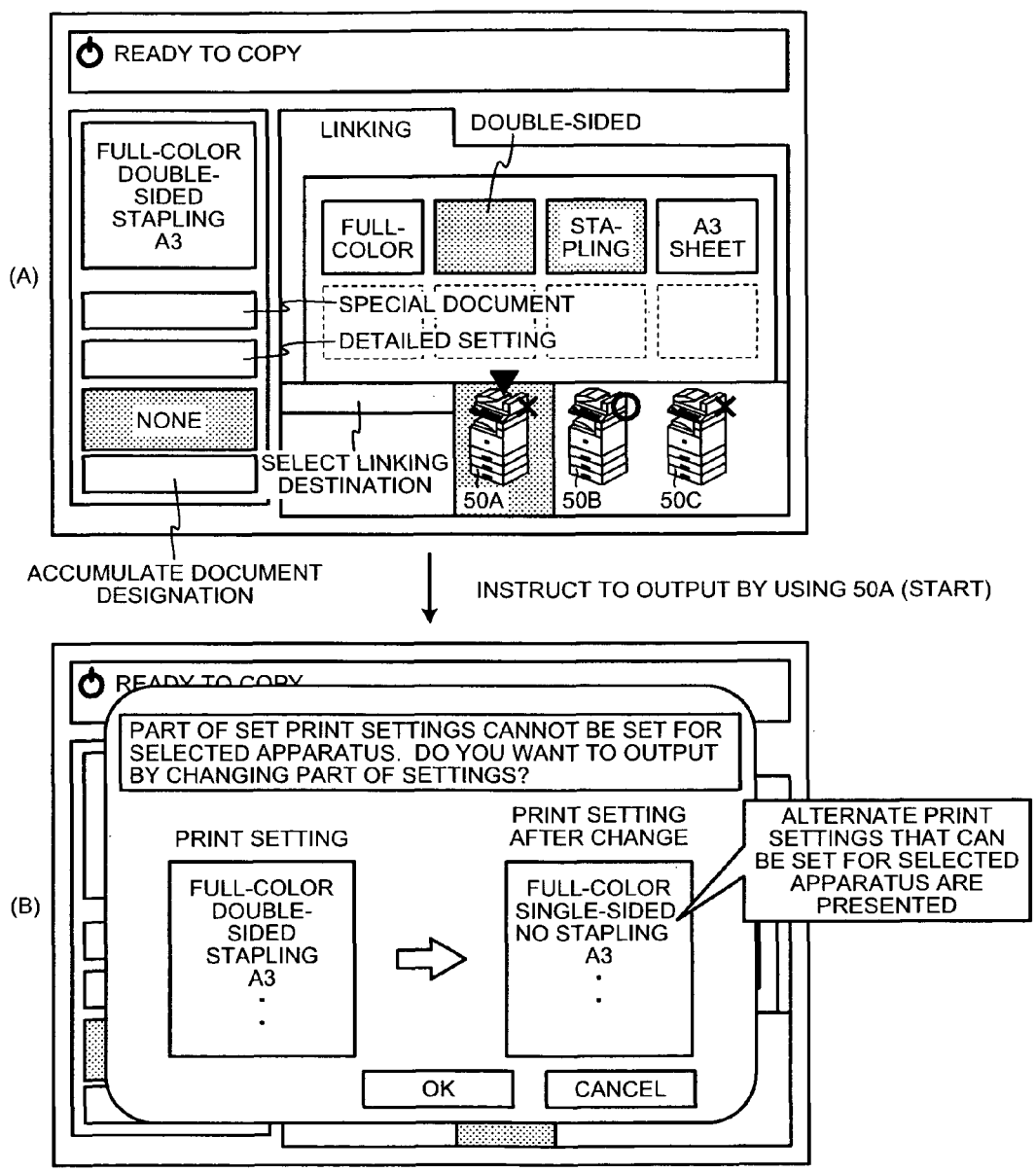
FIG. 16 is an exemplary diagram illustrating transitions of a print setting screen.

FIG. 16 is an exemplary diagram illustrating transitions of a print setting screen. FIG. 16(A) is similar to FIG. 9(A). On the print setting screen illustrated in FIG. 16(A), when an operation input of instructing to perform printing in the image forming apparatus 50A selected as the linked apparatus is performed, as illustrated in FIG. 16(B), displayed on the operation display unit 107 are: a warning that all or some of the print settings desired by the user cannot be set; the set content name of an alternate print setting that can be set for the image forming apparatus 50A selected as the linked apparatus; or a message used for checking whether or not printing is performed at the alternate print setting by the image forming apparatus 50A selected as the linked apparatus. As the user performs an operation input of pressing an operating button "OK" for the corresponding message, an operation input of approving to perform printing in the image forming apparatus 50A selected as the linked apparatus is performed, and as the user performs an operation input of pressing an operation button "cancel," an operation input of denying to perform printing in the image forming apparatus 50A selected as the linked apparatus is performed. As above, by notifying that a desired setting cannot be set for the image forming apparatus 50A selected by the user as the linked apparatus, printing at a print setting that is not desired by the user can be prevented from being performed.

As described above, in a case where there is a print setting, which cannot be set for the operation apparatus for which the user performs an operation input, out of the print settings represented in user environment information that is shared by a plurality of image forming apparatuses 50 or print settings of which set contents are instructed to be changed by the user, a print result desired by the user can be output: by searching for an image forming apparatus 50 for which the corresponding print setting can be set and presenting the image forming apparatus to the user; and by ralizing printing at print settings desired by the user.

Second Embodiment

Next, an image forming apparatus, an image forming system, a method of supporting an operation input, and a program, according to a second embodiment will be described. Each portion common to the above-described first embodiment will be described with the same reference numeral assigned thereto, or the description thereof will not be repeated.

Figure 17:
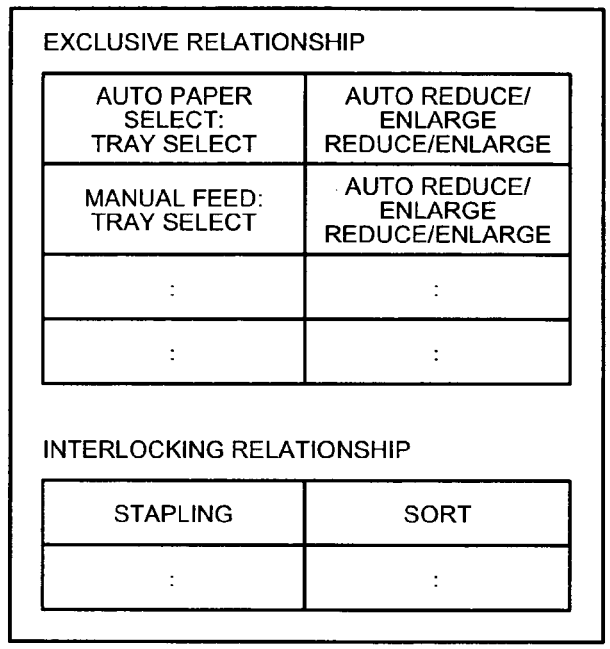
FIG. 17 is an exemplary diagram illustrating capability information according to a second embodiment.

In the second embodiment, as the capabilities of the image forming apparatus 50, other than the print settings that can be set for the image forming apparatus 50, exclusive relationship among a plurality of print settings and interlocking relationship among a plurality of print settings are handled. Here, the exclusive relationship is a relationship in which a plurality of print settings is prohibited from being combined and is a relationship in which the print settings cannot be simultaneously set being combined. In addition, the interlocking relationship is a relationship in which, of a plurality of print settings, one side is set so as to be interlocked with the setting of the other side. The capability information also represents the exclusive relationship or the interlocking relationship of the plurality of print settings. FIG. 17 is an exemplary diagram illustrating the capability information according to the second embodiment. In FIG. 17, it is represented that a print setting of "automatic sheet selecting (feeding)" and a print setting of "sheet designated variable power (printing)" in which a sheet is designated, and an image is printed at a variable power have the exclusive relationship. In addition, it is represented that a print setting of "stapling" and a print setting of "sorting" have the interlocking relationship.

After an operation input of selecting a linked apparatus is performed by a user, when the capability information is acquired from the linked apparatus, the capability acquiring unit 202 of the operation apparatus stores the capability information, for example, in the HDD 103. Furthermore, in a case where there is a plurality of linked apparatuses, the capability information is stored such that the linked apparatus can be identified. For example, identification information such as the apparatus number or the IP address of the image forming apparatus 50 as the linked apparatus is stored in association with the capability information. When an operation input of instructing to change the set content of a print setting is performed after an operation input of selecting a linked apparatus is performed by the user, the settability determining unit 203 of the operation apparatus determines that a print setting having the exclusive relationship with the print setting of which the set content is instructed to be changed cannot be set and a print setting that is contrary to the corresponding print setting can be set by: acquiring the capability information of the linked apparatus that is stored in the HDD 103 by the capability acquiring unit 202; and by comparing the capability information with the print setting information. In addition, the settability determining unit 203 determines a print setting that has the interlocking relationship with a print setting of which the set content is instructed to be changed to be settable. The settability determining unit 203 stores the setting information, which represents the settability of each printing setting, in the HDD 103.

Figure 18:
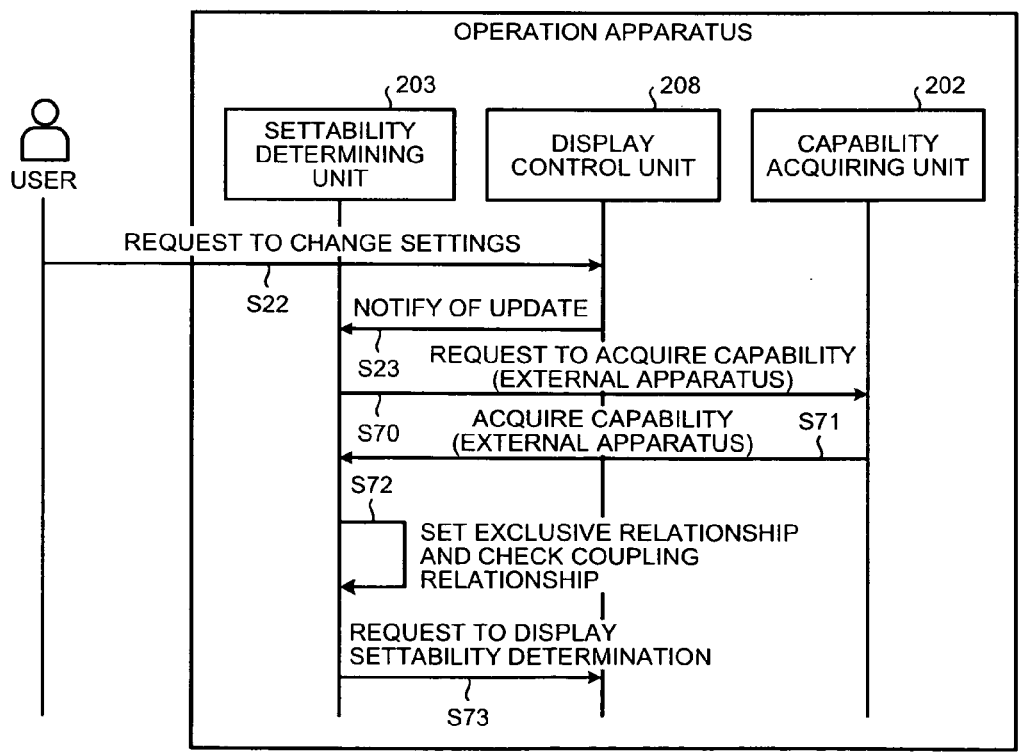
FIG. 18 is a flowchart illustrating the process sequence performed by an image forming system.

Next, the process sequence that is performed by the image forming system according to the second embodiment will be described. Here, after steps S1 to S20 illustrated in FIG. 8 and steps S40 to S49 illustrated in FIG. 11, which have been described in the first embodiment, the process sequence in a case where an operation input of instructing to change the set content of the print setting is performed by the user on the print setting screen displayed on the operation display unit 107 will be described with reference to FIG. 18. Furthermore, in step S47 illustrated in FIG. 11, the capability acquiring unit 202 of the operation apparatus stores the capability information acquired from the linked apparatus in the HDD 103. Steps S22 to S23 illustrated in FIG. 18 are the same as those illustrated in FIG. 10. In step S70, the settability determining unit 203 requests the capability information of the linked apparatus selected in step S40 illustrated in FIG. 11 from the capability acquiring unit 202. In step S71, the capability acquiring unit 202 reads out the capability information of the corresponding linked apparatus that is stored in the HDD 103 from the HDD 103 and delivers the capability information to the settability determining unit 203 in response to the request. In step S72, the settability determining unit 203 compares the read out capability information with the print setting information included in the user environment information acquired in step S3 illustrated in FIG. 8, determines that a print setting having the exclusive relationship with the print setting of which the set content is instructed to be changed in step S22 cannot be set, determines that a print setting that is contrary to the print setting can be set, determines that a print setting having the interlocking relationship with the print setting of which the set content is instructed to be changed in step S22 can be set, and stores the settability information representing the settability of each print setting in the HDD 103. In step S73, the settability determining unit 203 requests the display control unit 208 to display the settability of the print setting for the linked apparatus by delivering the settability information thereto. After step S73, the display control unit 208 displays a print setting screen, on which the settability of the print settings for the linked apparatus is reflected, on the operation display unit 107 in accordance with the request.

Figure 19:
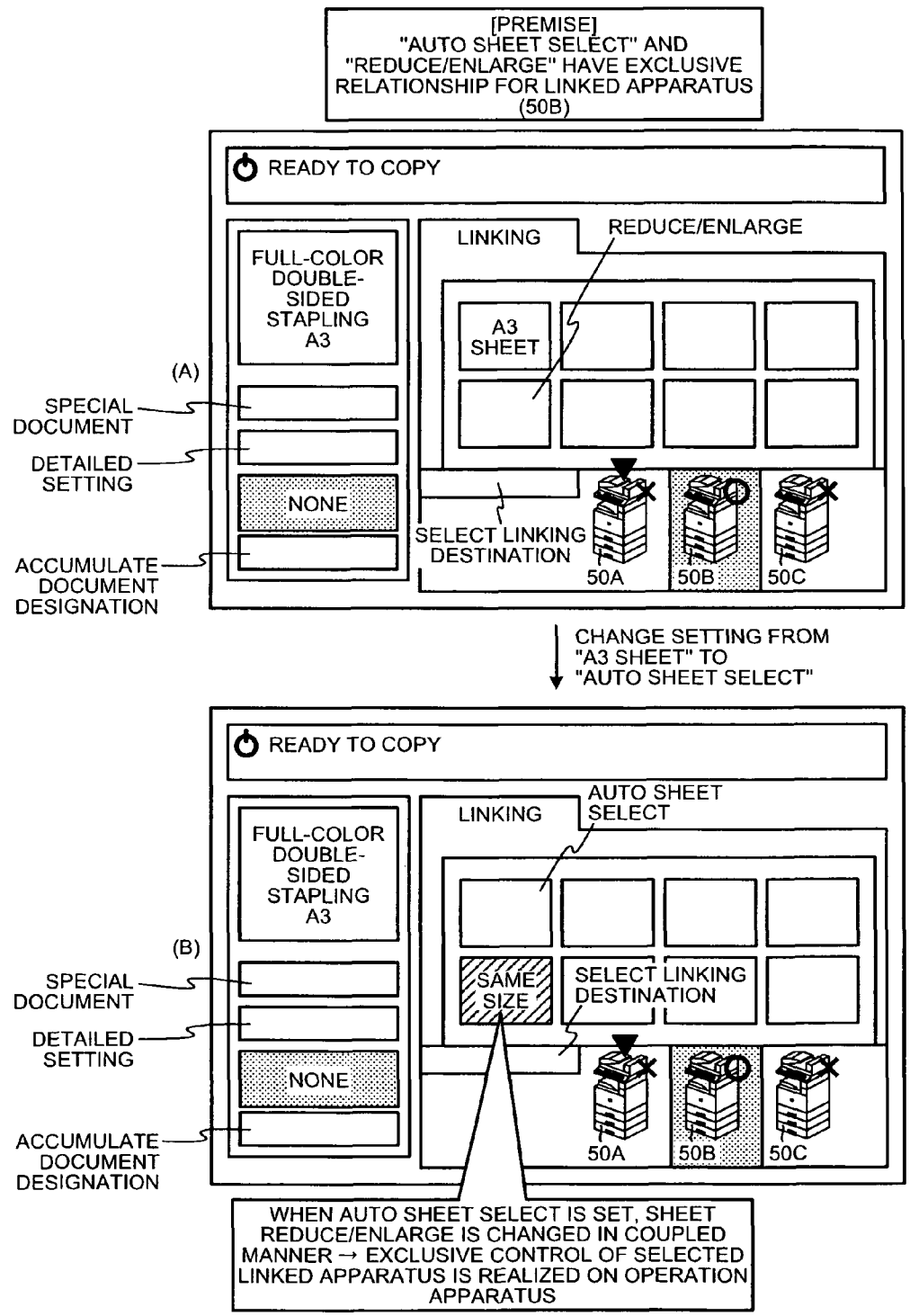
FIG. 19 is an exemplary diagram illustrating transitions of a print setting screen.

FIG. 19 is an exemplary diagram illustrating transitions of a print setting screen. In FIG. 19, it is assumed that the image forming apparatus 50B is selected as a linked apparatus, and the exclusive relationship and the interlocking relationship, which are illustrated in FIG. 17, are represented in the capability information of the image forming apparatus 50B. In this case, as illustrated in FIG. 19(A), it is represented that print settings of "A3 sheet feeding" and "sheet designated variable power (printing)" can be set for the image forming apparatus 50B. On the print setting screen illustrated in FIG. 19(A), when an operation input of changing "A3 sheet feeding" to "automatic sheet selecting (feeding)" as the set content of the print setting is performed, as described above, "automatic sheet selecting (feeding)" and the "sheet designated variable power (printing)" have the exclusive relationship, and accordingly, it is determined that "sheet designated variable power (printing)" cannot be set, and "same size (printing)" contrary to the "sheet designated variable power (printing)" can be set. As a result, on the print setting screen, it is displayed that "automatic sheet selecting (feeding) can be set, and it is displayed that "same size (printing)" can be set.

According to the above-described configuration, it is possible for the operation apparatus to perform exclusive control or interlocking control of the print settings of the linked apparatus. Therefore, the user convenience can be further improved.

Third Embodiment

Next, an image forming apparatus, an image forming system, a method of supporting an operation input, and a program, according to a third embodiment will be described. Each portion common to the above-described first or second embodiment will be described with the same reference numeral assigned thereto, or the description thereof will be omitted.

In the third embodiment, in a case where an operation input of instructing to change the set content of the print setting is performed after an operation input of selecting a linked apparatus is performed on the print setting screen by the user, the operation apparatus searches for a linked apparatus for which the print setting instructed to be changed can be set and automatically selects the corresponding linked apparatus.

Specifically, the search unit 206 distinguishes those image forming apparatuses 50 for which all the print settings represented in the print setting information changed in accordance with the user's operation input can be set from other image forming apparatuses 50 for which all or some of the print settings cannot be set; and the search unit 206 requests the search result output unit 207 to output a search result on the basis of the settability information.
Then, the search result output unit 207 displays a print setting screen on the operation display unit 107 via the display control unit 208 in response to the request from the search unit 206; where the settability of the print settings for the image forming apparatus 50 is reflected on the print setting screen; where the print setting for the image forming apparatus 50, of which the set content is changed, is determined to be settable by the search unit 206.

Figure 20:
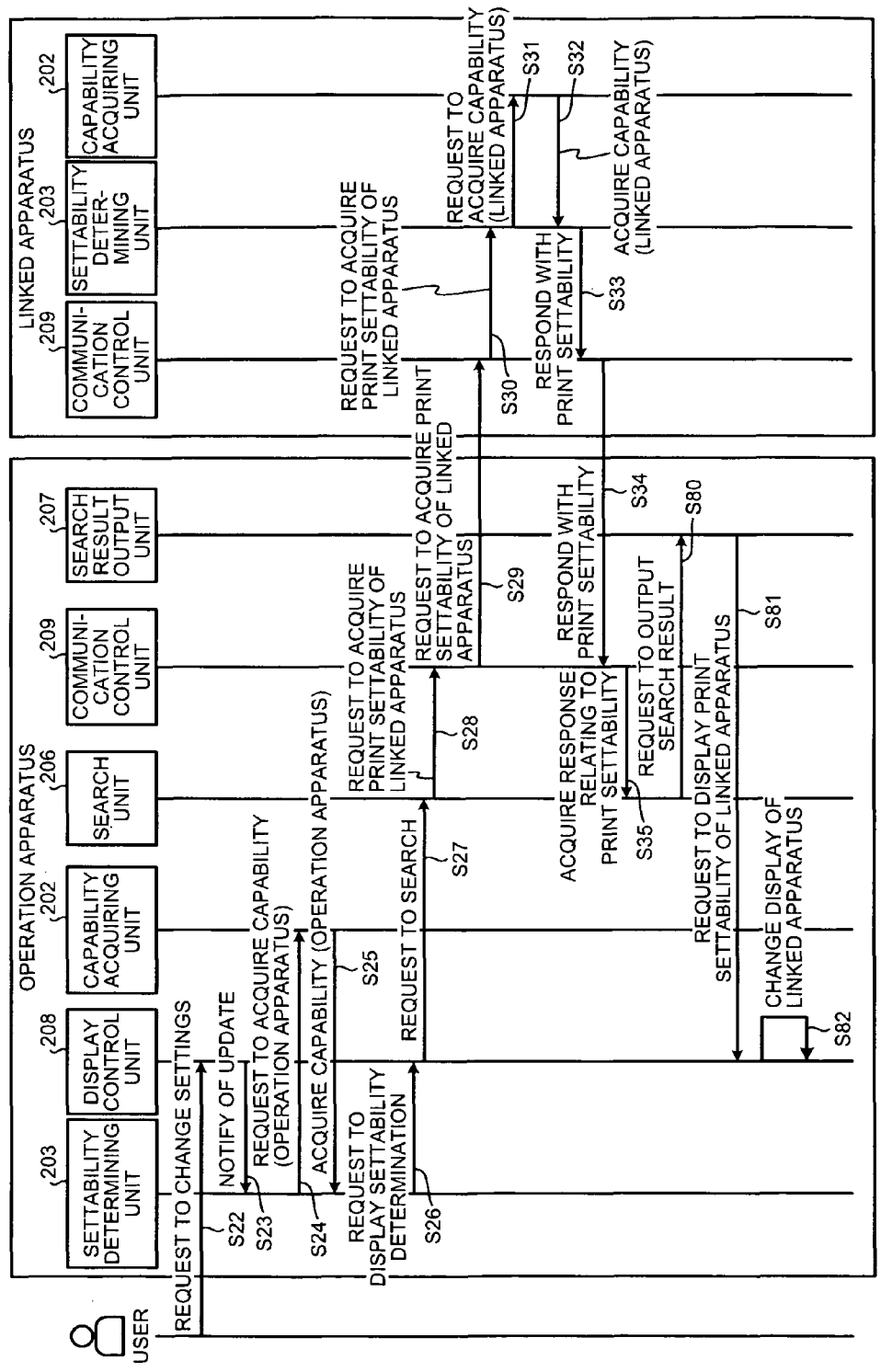
FIG. 20 is a flowchart illustrating the process sequence performed by an image forming system according to a third embodiment.

Next, the process sequence that is performed by the image forming system according to the third embodiment will be described. Here, after steps S1 to S20 illustrated in FIG. 8 and steps S40 to S49 illustrated in FIG. 11, which have been described in the first embodiment, the process sequence in a case where an operation input of instructing to change the set content of the print setting is performed by the user on the print setting screen displayed on the operation display unit 107 will be described with reference to FIG. 20. Steps S22 to S35 are the same as those illustrated in FIG. 10. In step S80, upon receiving the settability information from the communication control unit 209 in step S35; the search unit 206 distinguishes those image forming apparatuses 50 for which all the print settings represented in the print setting information changed in step S22 can be set from other image forming apparatuses 50 for which all or some of the print settings cannot be set; and the search unit 206 requests the search result output unit 207 to output a search result on the basis of the settability information. In step S81, the search result output unit 207 requests the display control unit 208 to display the settability of the print settings for the image forming apparatuses 50 for which the print settings are determined to be settable in step S80 in response to the request. In step S82, the display control unit 208 displays the print setting screen on which the settability of the print settings for the image forming apparatuses 50 is reflected on the operation display unit 107 in response to the request.

Figure 21:
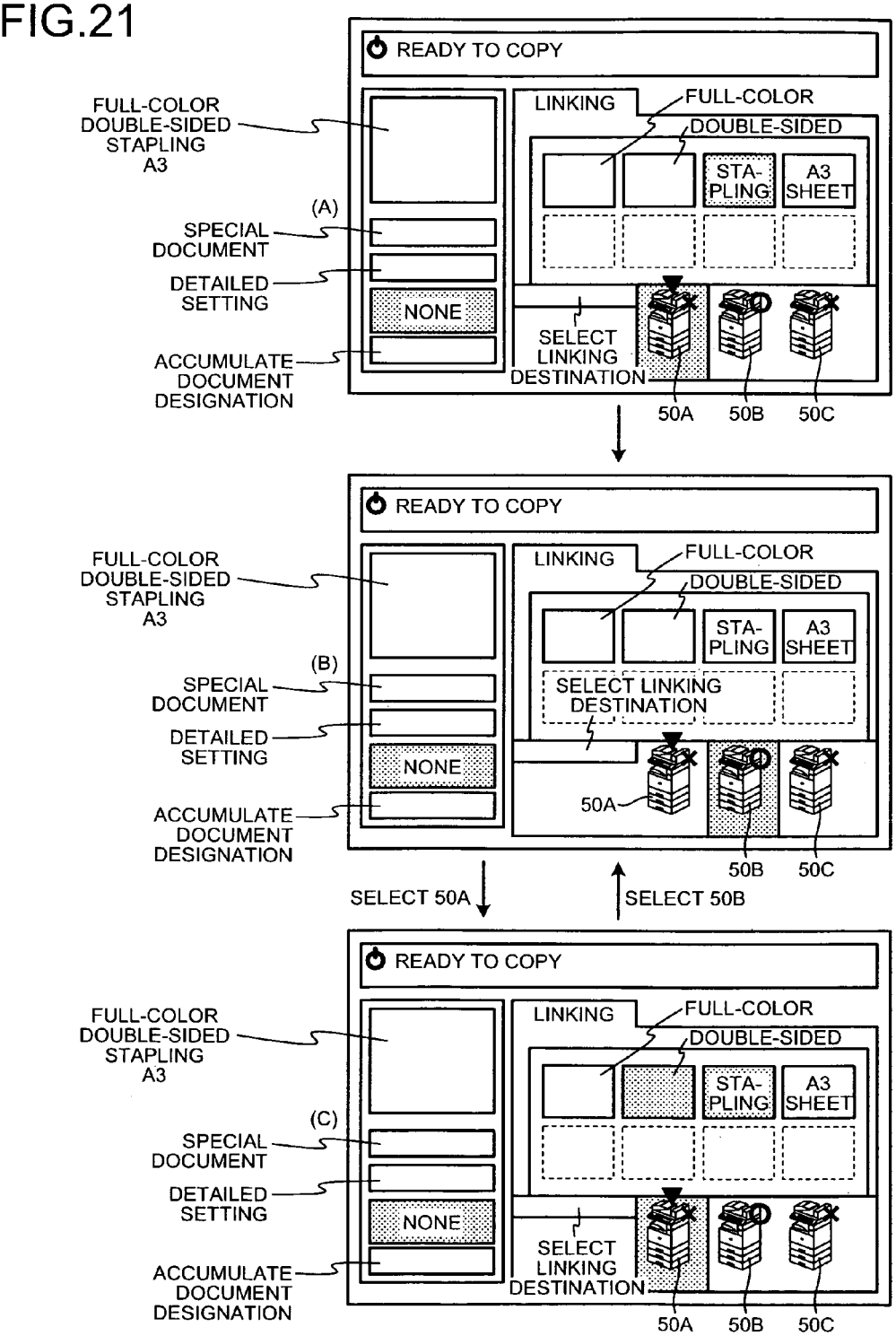
FIG. 21 is an exemplary diagram illustrating transitions of a print setting screen.

FIG. 21 is an exemplary diagram illustrating transitions of a print setting screen. In FIG. 21(A), it is assumed that the image forming apparatus 50A is selected as a linked apparatus, and a print setting screen on which settability of the print setting for the image forming apparatus 50A is reflected is illustrated in FIG. 21(A). On the print setting screen illustrated in FIG. 21(A), when an operation input of instructing to change "one-sided (printing)" to "double-sided (printing)" as the print setting is performed, the image forming apparatus 50 for which "double-sided (printing)" can be set is determined to be the image forming apparatus 50B based on the capability information illustrated in FIG. 6 as an example by the search unit 206 in step S80, and as a result, as illustrated in FIG. 21(B), a print setting screen on which the settability of the print settings for the image forming apparatus 50B is reflected is displayed on the operation display unit 107 by the display control unit 208 in step S82. In other words, the display on the operation display unit 107 is changed from the print setting screen illustrated in FIG. 21(A) to the print setting screen illustrated in FIG. 21(B). In FIG. 21(A) the settability of the print settings for the image forming apparatus 50A is reflected, while in FIG. 21(B) the settability of the print settings for the image forming apparatus 50B is reflected. On the print setting screen illustrated in FIG. 21(B), in a case where an operation input of selecting the image forming apparatus 50A as a linked apparatus is performed, the process of steps S40 to S49, which are illustrated in FIG. 11, described in the first embodiment is performed. However, in step S48, the capability information of the image forming apparatus 50A is compared with the print setting information changed in step S22 by the settability determining unit 203, and as a result, as illustrated in FIG. 21(C), a print setting screen on which the settability of print settings for the image forming apparatus 50A is reflected is displayed on the operation display unit 107. In the capability information illustrated in FIG. 6 as an example, since it is represented that "double-sided (printing)" cannot be set for the image forming apparatus 50A, the set content name of "double-sided (printing)" is hatched in the print setting screen illustrated in FIG. 21(C). Furthermore, in a case where the print setting instructed to change the set content in accordance with the operation input received in step S22 can be set for the image forming apparatus 50, which has been selected as the linked apparatus in advance, the print setting is determined to be settable for the image forming apparatus 50 in step S80. Accordingly, in step S82, since a print setting screen on which the settability of the print settings for the image forming apparatus 50 is reflected is displayed on the operation display unit 107 in step S82, there is a case where the linked apparatus is not changed.

According to the above-described configuration, the image forming apparatus 50 for which the print settings desired by the user can be set is automatically selected, and whereby user's efforts relating to the operation input can be eliminated.

Modified Example

The present invention is not limited to the above-described embodiments and may be embodied by changing the constituent elements in the form within the scope not departing from the concept thereof in an implementation step. In addition, various inventions may be formed by appropriately combining a plurality of constituent elements disclosed in the above-described embodiments. For example, several constituent elements may be omitted from among all the constituent elements disclosed in each embodiment. In addition, the constituent elements of different embodiments may be appropriately combined. Furthermore, various changes in the form as illustrated below can be made.

In each of the above-described embodiments, it may be configured such that various programs executed by the image forming apparatus 50 are stored in a computer connected to a network such as the Internet and are provided by being downloaded through the network. In addition, it may be configured such that the various programs are recorded on a computer-readable recording medium such as a CD-ROM, a flexible disk (FD), a CD-R, or a digital versatile disk (DVD) as a file in an installable format or in an executable format and are provided as a computer program product.

In each of the above-described embodiments, although the image forming apparatus 50 has been described as being able to realize the scanner function and the copy function, the image forming apparatus 50 is not limited thereto and may be configured to be able to realize at least one of the scanner function, the copy function, the printer function and the facsimile function. In such a case, the image forming apparatus 50 performs image processing corresponding to each function, and settings relating to the image processing at the time of performing the image processing can be performed in accordance with a user's operation input.

In each of the above-described embodiments, although the user environment server 60 has been described as storing the user environment information therein, the invention is not limited thereto. Thus, the user environment information may be stored in the image forming apparatuses 50A, 50B, and 50C so as to be shared.

In each of the above-described embodiments, in a case where an operation input of instructing to change the set contents of the print settings is performed by a user, the capability information of the linked apparatus is acquired, and the settability of the print settings for the linked apparatus is reflected on the print setting screen by using the capability information acquired at that time. However, it may be configured such that, when the capability information of the linked apparatus is acquired, for example, in step S17 illustrated in FIG. 8, the operation apparatus stores the capability information in the HDD 103, and, in a case where an operation input of instructing to change the set contents of the print settings is performed by the user, the print setting screen on which the settability of the print settings for the linked apparatus is reflected is displayed on the operation display unit 107 by using the capability information of the linked apparatus stored in the HDD 103.

Figure 22:
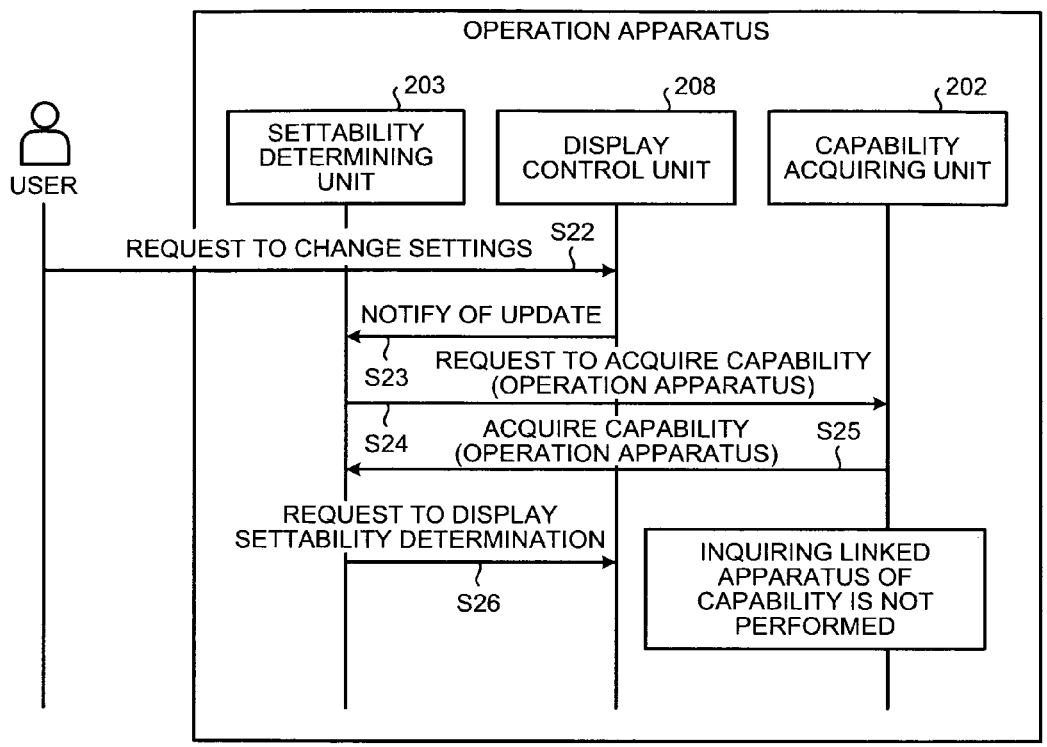
FIG. 22 is a flowchart illustrating the process sequence performed by an image forming system according to a modified example.

In addition, as illustrated in FIG. 22 as an example, the operation apparatus may display the print setting screen on which the settability of the print settings for the linked apparatus is not updated on the operation display unit 107 without newly acquiring the capability information of the linked apparatus by performing steps S23 to S26 after step S22.

According to the above-described configuration, the occurrence of communication for acquiring the capability information from the linked apparatus can be suppressed.

In the above-described second embodiment, although the capability information additionally represents the exclusive relationship and the interlocking relationship of a plurality of print settings, the capability information is not limited thereto and may represent any one of the exclusive relationship and the interlocking relationship. According to such a configuration, in a case where the exclusive relationship is represented in the capability information, in step S72 illustrated in FIG. 18, the settability determining unit 203 compares the capability information with the print setting information included in the user environment information acquired in step S3 illustrated in FIG. 8 and determines that a print setting having the exclusive relationship with the print setting of which the set contents are instructed to be changed in step S22 cannot be set, and a print setting that is contrary to the print setting can be set. Alternatively, in a case where the interlocking relationship is represented in the capability information, the settability determining unit 203 compares the capability information with the print setting information included in the user environment information acquired in step S3 illustrated in FIG. 8 and determines that a print setting having the interlocking relationship with the print setting of which the set contents are instructed to be changed in step S22 can be set.

According to the present invention, in an image forming apparatus connected to an image forming system in which image processing can be performed by linking a plurality of image forming apparatuses, the image processing with a setting desired by a user can be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that is connected to an image forming system in which a plurality of image forming apparatuses being linked can perform image processing, and serves as an operation target on which an operation input is performed by a user, the image forming apparatus comprising:
   a user environment information acquiring unit that acquires user environment information, which is information shared among the plurality of image forming apparatuses, including screen layout information that represents a layout of a screen displayed by a display unit when the user performs the operation input of instructing to perform the image processing and setting information that represents various settings relating to the image processing;

a user environment information reflecting unit that generates the screen representing the settings by using the user environment information acquired by the user environment information acquiring unit;

a capability acquiring unit that acquires capability information representing capabilities, relating to all or a part of the settings, of the plurality of image forming apparatuses;

a settability determining unit that determines the settability of various settings represented in the setting information by using the capability information acquired by the capability acquiring unit and the setting information included in the user environment information;

a display control unit that is a unit displaying the screen on the display unit and further displays the screen that represents a determination result of the settability determining unit on the display unit;

a search unit that searches for a first image forming apparatus for which the various settings represented in the setting information can be set and a second image forming apparatus for which all or a part of the various settings represented in the setting information cannot be set; and a search result output unit that further displays the screen representing a search result of the search unit on the display unit through the display control unit.

2. The image forming apparatus according to claim 1, further comprising:

an input receiving unit that receives the operation input of the user on the screen displayed on the display unit; and a linked-apparatus selecting unit that selects a third image forming apparatuses being liked as a candidate for performing the image processing from the plurality of image forming apparatuses in accordance with the operation input received by the input receiving unit, wherein the capability acquiring unit requests the capability information from the third image forming apparatus selected by the linked-apparatus selecting unit, wherein the settability determining unit determines the settability of the various settings represented in the corresponding setting information for the third image forming apparatus by using the capability information of the third image forming apparatus that is acquired by the capability information acquiring unit and the setting information, and wherein the display control unit displays the screen on the display unit such that a print setting determined to be settable for the third image forming apparatus by the settability determining unit and a print setting determined not to be settable for the third image forming apparatus by the settability determining unit have different display forms.

3. The image forming apparatus according to claim 2, wherein the capability information additionally represents an exclusive relationship of a plurality of settings, and wherein the settability determining unit, by using the capability information of the third image forming apparatus that is acquired by the capability acquiring unit and the setting information, determines that a first print setting in which the exclusive relationship with all or a part of the various settings represented in the setting information is represented in the capability information cannot be set for the third image forming apparatus and determines that a second print setting that is contrary to the first print setting can be set for the third image forming apparatus.

4. The image forming apparatus according to claim 2, wherein the capability information additionally represents an interlocking relationship of a plurality of settings, and wherein the settability determining unit, by using the capability information of the third image forming apparatus that is acquired by the capability acquiring unit and the setting information, determines that a third print setting in which the interlocking relationship with all or a part of the various settings represented in the setting information is represented in the capability information can be set for the third image forming apparatus.

5. The image forming apparatus according to claim 2, further comprising:

an apparatus linking unit that transmits a process request for requesting to perform the entire or a part of the image processing to the third image forming apparatus in a case where the operation input of instructing the third image forming apparatus to perform the entire or a part of the image processing is received by the input receiving unit.

6. The image forming apparatus according to claim 5, wherein the display control unit, in a case where the input receiving unit receives the operation input of instructing the third image forming apparatus to perform the entire or a part of the image processing, displays a message that notifies the setting which can be set for the third image forming apparatus on the display unit.

7. The image forming apparatus according to claim 6, wherein, in a case where the input receiving unit receives the operation input of instructing the third image forming apparatus to perform the entire or a part of the image processing, after the message is displayed on the display unit, in a case where the input receiving unit receives the operation input of approving the third image forming apparatus to perform the entire or a part of the image processing, the apparatus linking unit transmits a process request for requesting to perform the entire or a part of the image processing to the third image processing apparatus.

8. The image forming apparatus according to claim 1, wherein the search unit receives settability information that represents the settability of the various settings represented in the setting information from all or a part of the image forming apparatuses other than the image forming apparatus serving as the operation target out of the plurality of image forming apparatuses and searches for the first image forming apparatus and the second image forming apparatus.

9. The image forming apparatus according to claim 1, further comprising:

a memory unit that stores therein the capability information of the image forming apparatus serving as the operation target and all or a part of other image forming apparatuses out of the plurality of image forming apparatuses, wherein the capability acquiring unit acquires the capability information of the image forming apparatus serving as the operation target and the capability information of all or a part of the other image forming apparatuses by reading out the capability information from the memory unit, and wherein the settability determining unit determines the settability of the various settings represented in the corresponding setting information for the image forming apparatus serving as the operation target and all or a part of the other image forming apparatuses by using the capability information of the image forming apparatus serving as the operation target that is acquired by the capability acquiring unit, the capability information of all or a part of the other image forming apparatuses, and the setting information.

10. The image forming apparatus according to claim 1, further comprising:
an input receiving unit that receives the operation input of a user on the screen displayed on the display unit,
wherein the control unit, in a case where an operation input of instructing to change set contents of the settings is received by the input receiving unit, displays the screen on which the set contents are changed on the display unit.

11. The image forming apparatus according to claim 10,
wherein the capability information acquiring unit acquires the capability information of the image forming apparatus serving as the operation target when the operation input of instructing to change the set content of the settings is received by the input receiving unit,
wherein the settability determining unit determines the settability of the settings of which the set content is instructed to be changed for the image forming apparatus serving as the operation target by using the capability information acquired by the capability acquiring unit,
wherein the display control unit displays the screen on the display unit such that the print setting determined to be settable for the image forming apparatus serving as the operation target by the settability determining unit and the print setting determined not to be settable for the image forming apparatus serving as the operation target have different display forms,
wherein the search unit receives settability information that represents the settability of the settings of which the set content is instructed to be changed from all or a part of the image forming apparatuses other than the image forming apparatus serving as the operation target out of the plurality of image forming apparatuses and searches for the first image forming apparatus and the second image forming apparatus, and
wherein the search result output unit displays the screen that additionally represents a search result of the search unit on the display unit through the display control unit.

12. The image forming apparatus according to claim 10,
wherein the capability information acquiring unit, in a case where the operation input of instructing to inquire all or a part of the plurality of image forming apparatuses of the settability of the setting of which the set content of the setting is instructed to be changed is received by the input receiving unit, acquires the capability information of the image forming apparatus serving as the operation target,
wherein the display control unit displays the screen on the display unit such that the print setting determined to be settable for the image forming apparatus serving as the operation target by the settability determining unit and the print setting determined not to be settable for the image forming apparatus serving as the operation target by the settability determining unit have different display forms,
wherein the search unit receives settability information that represents the settability of the settings of which the set content is instructed to be changed from all or a part of the image forming apparatuses other than the image forming apparatus serving as the operation target out of the plurality of image forming apparatuses and searches for the first image forming apparatus and the second image forming apparatus, and
wherein the search result output unit displays the screen that additionally represents a search result of the search unit on the display unit through the display control unit.

13. The image forming apparatus according to claim 10,
wherein the search unit, in a case where the set content of the settings is changed, searches for a fourth image forming apparatus for which the settings of which the set content is changed can be set, and
wherein the display control unit displays the screen on the display unit such that the setting determined to be settable for the fourth image forming apparatus, which is searched by the search unit, by the settability determining unit and the setting determined not to be settable for the third image forming apparatus by the settability determining unit have different display forms.

14. An image forming system in which a plurality of image forming apparatuses being linked can perform image processing,
wherein an image forming apparatus serving as an operation target, for which an operation input is performed by a user, out of the plurality of image forming apparatuses, comprises:
a user environment information acquiring unit that acquires user environment information, which is information shared among the plurality of image forming apparatuses, including screen layout information that represents a layout of a screen displayed by a display unit when the user performs the operation input of instructing to perform the image processing and setting information that represents various settings relating to the image processing;
a user environment information reflecting unit that generates the screen representing the settings by using the user environment information acquired by the user environment information acquiring unit;
a first capability acquiring unit that acquires capability information representing capabilities relating to all or a part of the settings of the plurality of image forming apparatuses;
a first settability determining unit that determines the settability of various settings represented in the setting information by using the capability information acquired by the first capability acquiring unit and the setting information included in the user environment information;
a display control unit that is a unit displaying the screen on the display unit and displays the screen that additionally represents a determination result of the first settability determining unit on the display unit;
a search unit that receives settability information representing settability of all or a part of the various settings represented in the setting information from all or a part of the image forming apparatuses other than the image forming apparatus serving as the operation target out of the plurality of image forming apparatuses, and searches for a first image forming apparatus for which all or a part of the various settings represented in the setting information can be set and a second image forming apparatus for which all or a part of the various settings represented in the setting information cannot be set; and
a search result output unit that displays the screen further representing a search result of the search unit on the display unit through the display control unit, and
wherein all or a part of the other image forming apparatuses each comprises:

a second capability acquiring unit that acquires the capability information of the image forming apparatus to which the second capability acquiring unit belongs;

a second settability determining unit that determines the settability of various settings represented in the setting information by using the capability information acquired by the second capability acquiring unit and the setting information included in the user environment information; and a transmission unit that transmits the settability information representing a determination result of the first settability determining unit to the image forming apparatus serving as the operation target.

15. A method of supporting an operation input which is performed by an image forming apparatus that is connected to an image forming system in which a plurality of image forming apparatuses being linked can perform image processing, and serves as an operation target on which an operation input is performed by a user, wherein the image forming apparatus serving as the operation target includes a user environment information acquiring unit, a user environment information reflecting unit, a capability acquiring unit, a settability determining unit, a display control unit, a search unit, and a search result output unit, the method comprising:

acquiring user environment information, which is information shared among the plurality of image forming apparatuses, including screen layout information that represents a layout of a screen displayed by a display unit when the user performs the operation input of instructing to perform the image processing and setting information that represents various settings relating to the image processing by using the user environment information acquiring unit;

generating the screen representing the settings by using the user environment information acquired by the user environment information acquiring unit by using the user environment information reflecting unit;

acquiring capability information representing capabilities relating to all or a part of the settings of the plurality of image forming apparatuses by using the capability acquiring unit;

determining the settability of various settings represented in the setting information by using the capability information acquired by the capability acquiring unit and the setting information included in the user environment information by using the settability determining unit;

displaying the screen that further represents a determination result of the settability determining unit on the display unit by using the display control unit as a unit for displaying the screen on the display unit;

searching for a first image forming apparatus for which the various settings represented in the setting information can be set and a second image forming apparatus for which all or a part of the various settings represented in the setting information cannot be set, by using the search unit; and displaying the screen additionally representing a search result of the search unit on the display unit through the display control unit by using the search result output unit.

* * * * *